US012533876B2

(12) United States Patent
Kamei

(10) Patent No.: US 12,533,876 B2

(45) Date of Patent: Jan. 27, 2026

(54) LIQUID DISCHARGE APPARATUS AND LIQUID DISCHARGE METHOD

(71) Applicant: Kenji Kamei, Kanagawa (JP)

(72) Inventor: Kenji Kamei, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 135 days.

(21) Appl. No.: 18/542,777

(22) Filed: Dec. 18, 2023

(65) Prior Publication Data

US 2024/0208205 A1 Jun. 27, 2024

(30) Foreign Application Priority Data

Dec. 26, 2022 (JP) ................................ 2022-208161

(51) Int. Cl.

*B41J 2/045* (2006.01)
*B41J 2/165* (2006.01)
*B41J 29/393* (2006.01)

(52) U.S. Cl.

CPC ......... *B41J 2/0451* (2013.01); *B41J 2/04553* (2013.01); *B41J 2/04581* (2013.01); *B41J 2/16552* (2013.01); *B41J 29/393* (2013.01); *B41J 2029/3935* (2013.01); *B41J 2202/05* (2013.01)

(58) Field of Classification Search

CPC ............................................... B41J 2029/3935

See application file for complete search history.

(56) References Cited

U.S. PATENT DOCUMENTS

| | | | | |
|---|---|---|---|---|
| 5,473,351 A * | 12/1995 | Helterline | B41J 2/5056 | 347/19 |
| 6,454,382 B1 * | 9/2002 | Galentovski | B41J 29/38 | 347/14 |
| 2003/0085940 A1 * | 5/2003 | Yamada | B41J 29/393 | 347/19 |
| 2006/0055719 A1 * | 3/2006 | Furuya | B41J 29/393 | 347/14 |
| 2008/0007587 A1 * | 1/2008 | Watanabe | B41J 29/393 | 347/19 |
| 2020/0009876 A1 * | 1/2020 | Neeb | B41J 2/2142 | |

(Continued)

FOREIGN PATENT DOCUMENTS

| | | |
|---|---|---|
| JP | 2007-054970 A | 3/2007 |
| JP | 2008-162201 A | 7/2008 |

(Continued)

*Primary Examiner* — Shelby L Fidler

(74) *Attorney, Agent, or Firm* — XSENSUS LLP

(57) ABSTRACT

A liquid discharge apparatus includes: a liquid discharger to discharge a liquid from a nozzle; an imaging unit to capture a test pattern on a detection target member to acquire a test pattern image of the test pattern; circuitry configured to: cause the liquid discharger to discharge a first amount of the liquid per unit area from the nozzle onto a target object; cause the liquid discharger to discharge a second amount of the liquid per unit area larger than the first amount from the nozzle onto a detection target member to form the test pattern on the detection target member; perform image processing on the test pattern image on the detection target member acquired by the imaging unit; and determine presence or absence of abnormality in the nozzle based on the test pattern image obtained by the image processing.

12 Claims, 16 Drawing Sheets

(56) References Cited

U.S. PATENT DOCUMENTS

| | | | |
|---|---|---|---|
| 2021/0168246 | A1 | 6/2021 | Kamei et al. |
| 2023/0191777 | A1 | 6/2023 | Sugiura et al. |
| 2023/0202165 | A1 | 6/2023 | Kamei |

FOREIGN PATENT DOCUMENTS

| | | | |
|---|---|---|---|
| JP | 2012-133582 | A | 7/2012 |
| JP | 2016-066986 | A | 4/2016 |

* cited by examiner

NORMAL

CONSTANT DISCHARGE

NON-DISCHARGE

BEND

NOZZLE IS NORMAL

NOZZLE IS BENT

COMPARATIVE EXAMPLE

COMPARATIVE EXAMPLE

LIQUID DISCHARGE APPARATUS AND LIQUID DISCHARGE METHOD

CROSS-REFERENCE TO RELATED APPLICATIONS

This patent application is based on and claims priority pursuant to 35 U.S.C. § 119(a) to Japanese Patent Application No. 2022-208161, filed on Dec. 26, 2022, in the Japan Patent Office, the entire disclosure of which is hereby incorporated by reference herein.

BACKGROUND

Technical Field

The present embodiment relates to a liquid discharge apparatus and a liquid discharge method.

Related Art

An inkjet printing apparatus includes: a recording head that has a plurality of nozzles for discharging ink on printing paper and records an image on the printing paper at a predetermined resolution; a scanner that reads a predetermined test pattern recorded by the recording head at a resolution lower than the resolution of the recording head; an interpolation processing unit that performs interpolation processing on read data read by the scanner; and a determination unit that determines abnormality of the nozzles based on the read data interpolated by the interpolation processing unit.

SUMMARY

In an aspect of the present disclosure, a liquid discharge apparatus includes: a liquid discharger to discharge a liquid from a nozzle; an imaging unit to capture a test pattern on a detection target member to acquire a test pattern image of the test pattern; circuitry configured to: cause the liquid discharger to discharge a first amount of the liquid per unit area from the nozzle onto a target object; cause the liquid discharger to discharge a second amount of the liquid per unit area larger than the first amount from the nozzle onto a detection target member to form the test pattern on the detection target member; perform image processing on the test pattern image on the detection target member acquired by the imaging unit; and determine presence or absence of abnormality in the nozzle based on the test pattern image obtained by the image processing.

In another aspect of the present disclosure, a liquid discharge method includes: discharging a first amount of a liquid per unit area from a nozzle onto a target object; discharging a second amount of the liquid per unit area larger than the first amount from the nozzle onto a detection target member to form a test pattern on the detection target member; capturing the test pattern on the detection target member to acquire a test pattern image of the test pattern; performing image processing on the test pattern image; and detect an abnormal nozzle based on the test pattern image obtained by the image processing.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
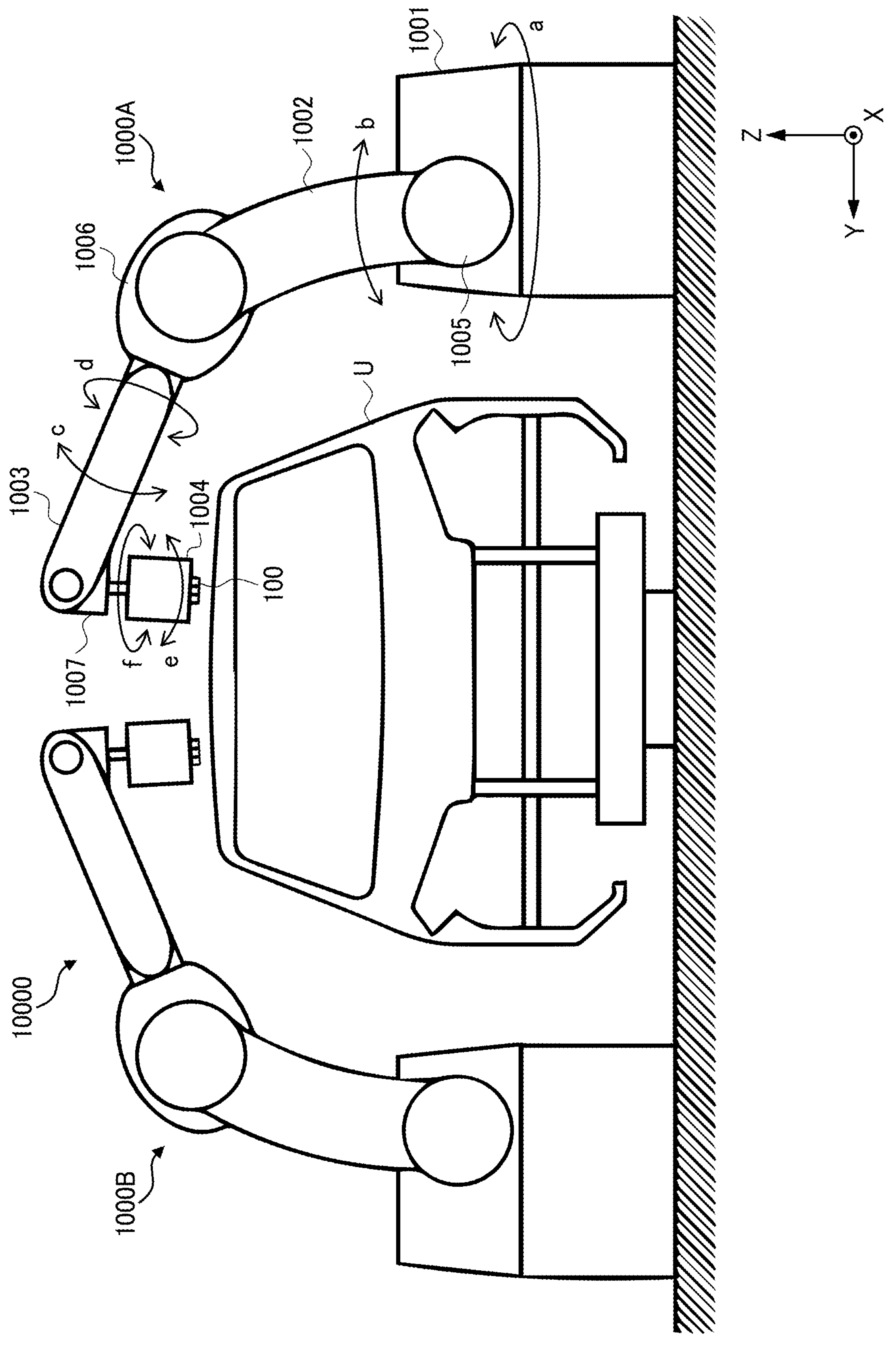
FIG. 1 is a schematic configuration diagram illustrating an example of a liquid discharge apparatus according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments for carrying out the invention will be described with reference to the drawings. In the description of the drawings, the same elements are denoted by the same reference numerals, and redundant description is omitted.

Outline of Liquid Discharge Apparatus

Figure 2:
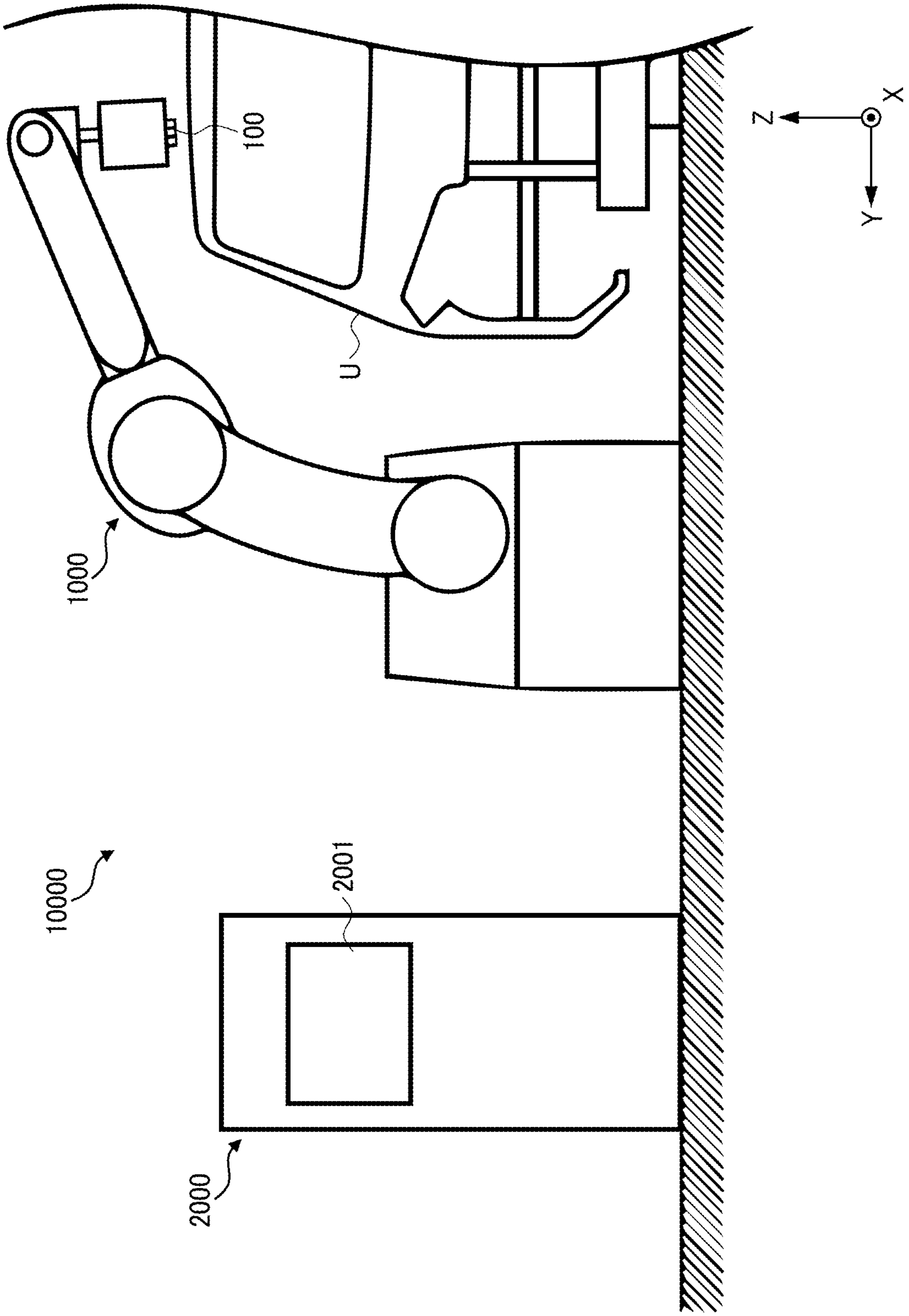
FIG. 2 is a schematic configuration diagram illustrating an example of the liquid discharge apparatus according to the embodiment.

First, an outline of a liquid discharge apparatus will be described with reference to FIGS. 1 and 2. FIGS. 1 and 2 are schematic configuration diagrams illustrating an example of the liquid discharge apparatus according to an embodiment. FIGS. 1 and 2 illustrate a coating system including a coating robot that applies a coating to a body of an automobile.

In a coating system 10000 that is an example of the liquid discharge apparatus, a coating robot 1000A is installed on the right side of a vehicle body U that is an example of a discharge target object, and a coating robot 1000B is installed on the left side of the vehicle body U. For example, the coating robot 1000A applies a coating to the right half of the entire outer plate of the vehicle body U, and the coating robot 1000B applies a coating to the left half of the entire outer plate of the vehicle body U. Hereinafter, the coating robot 1000A and the coating robot 1000B will be collectively referred to as "coating robot 1000".

The coating robot 1000 is an articulated robot, for example, and includes a base 1001, a first arm 1002 coupled to the base 1001, a second arm 1003 coupled to the first arm 1002, and an end effector 1004 coupled to the second arm 1003. The coating robot 1000 also includes a first joint 1005 coupling the base 1001 and the first arm 1002, a second joint 1006 coupling the first arm 1002 and the second arm 1003, and a third joint 1007 coupling the second arm 1003 and the end effector 1004.

The base 1001 is turnable in a direction of arrow a with an axis parallel to the Z axis as a rotation axis. The base 1001 supports one end portion of the first arm 1002 via the first joint 1005 such that the first arm 1002 is rotatable in a direction of arrow b with a horizontal axis (axis parallel to an XY plane) as a rotation axis. The other end portion of the first arm 1002 is coupled to one end portion of the second arm 1003 via the second joint 1006 such that the second arm 1003 is rotatable in a direction of an arrow c with a horizontal axis (axis parallel to the XY plane) as a rotation axis.

The second arm 1003 also includes an axis orthogonal to the rotation axis in the direction of arrow c, and can also rotate in a direction of arrow d with respect to the second joint 1006 with the orthogonal axis as a rotation axis. The other end portion of the second arm 1003 supports the end effector 1004 via the third joint 1007 such that the end effector 1004 is rotatable in a direction of arrow e with a horizontal axis (axis parallel to the XY plane) as a rotation axis. The end effector 1004 also includes an axis orthogonal to the rotation axis in the direction of arrow e, and can also rotate in a direction of arrow f with respect to the third joint 1007 with the orthogonal axis as a rotation axis.

In the coating robot 1000 configured as described above, the end effector 1004 can be freely moved with respect to the vehicle body U, and the head 100 attached to the end effector 1004 can be accurately disposed at a position where coating is applied to the vehicle body U. When disposed at the coating position, the head 100 discharges a coating material, which is an example of liquid, toward the vehicle body U to coat the vehicle body U.

The coating system 10000 includes a maintenance station 2000 in the reach of the coating robot 1000 as illustrated in FIG. 2. The maintenance station 2000 includes a maintenance/cleaning unit 2001, and the head 100 is moved to the maintenance/cleaning unit 2001 by the coating robot 1000, before coating, at the end of coating, or when the coating time has passed a prescribed time.

The maintenance/cleaning unit 2001 includes a cleaning mechanism that wipes and cleans the nozzle surface of the head 100, and a maintenance device such as a housing portion (dummy discharge receiver) for receiving a coating material discharged from the nozzles when the head 100 performs dummy discharge, for example.

The maintenance/cleaning unit 2001 also includes a medium plate that holds a test pattern formed through a discharge operation performed by all the nozzles of the head 100, before the coating or when the coating time has passed a predetermined time. The medium plate will be described later.

The maintenance/cleaning unit 2001 also includes a cleaning device that sprays a cleaning liquid or cleaning air to the nozzle surface of the head 100 to clean the nozzle surface, and a cleaning device that sprays a cleaning liquid or cleaning air to the medium plate to remove the test pattern from the medium plate.

In the present embodiment, the coating system 10000 has a configuration in which one coating robot 1000 is installed on each side of the vehicle body U, but the coating system is not limited to this configuration. The number of coating robots may be determined as appropriate based on the coating area of the vehicle body U, work efficiency, and the like, and the number of coating robots may be one or three or more in the coating system 10000.

If there is a plurality of coating robots 1000, the maintenance station 2000 may be shared by the plurality of coating robots, or may be installed for each coating robot. The maintenance station 2000 is installed at a position away from the vehicle body U so that the coating material discharged from the nozzles by the above-described dummy discharge, the cleaning liquid used for cleaning the nozzle surface and the medium plate, and the like do not adhere to the vehicle body U.

The discharge target object is not limited to a body of an automobile, and may be a vehicle other than an automobile, such as a body of an aircraft, a hull of a ship, or a body of a railway vehicle. The coating robot is not limited to a stationary robot, and may be a robot that can move by remote control or autonomous traveling, for example. In this case, the mobile robot is not limited to one that moves on the ground, and includes a climbing robot that climbs up and down a wall surface or an unmanned airplane represented by a drone. In the case of a mobile robot, a discharge target object is not limited to a vehicle, and a road or a building is also a discharge target object, and it is possible to apply a coating to road marks (crosswalk, stop line, speed display, etc.) on roads, the outer wall of a building, and the like.

Schematic Configuration and Operation of Head

Figure 3A:
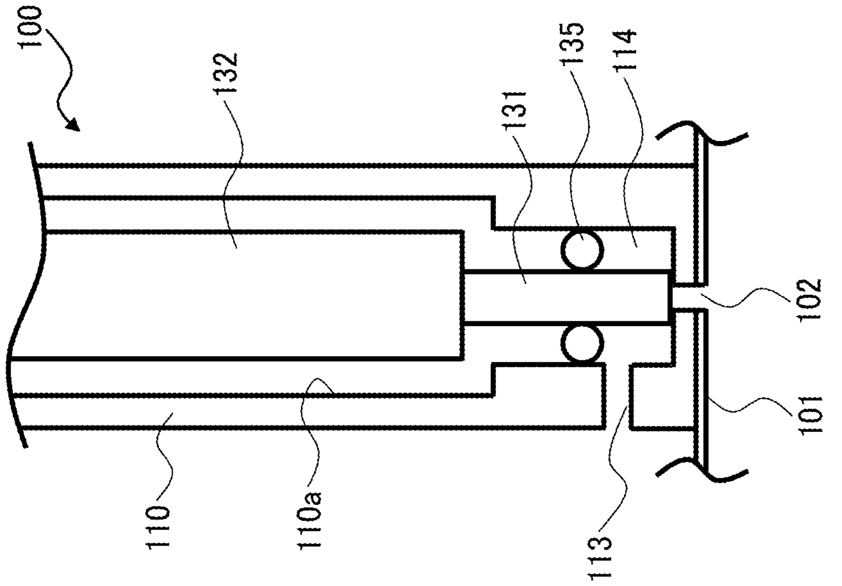
FIGS. 3A and 3B are diagrams describing a schematic configuration of a head.
Figure 3B:
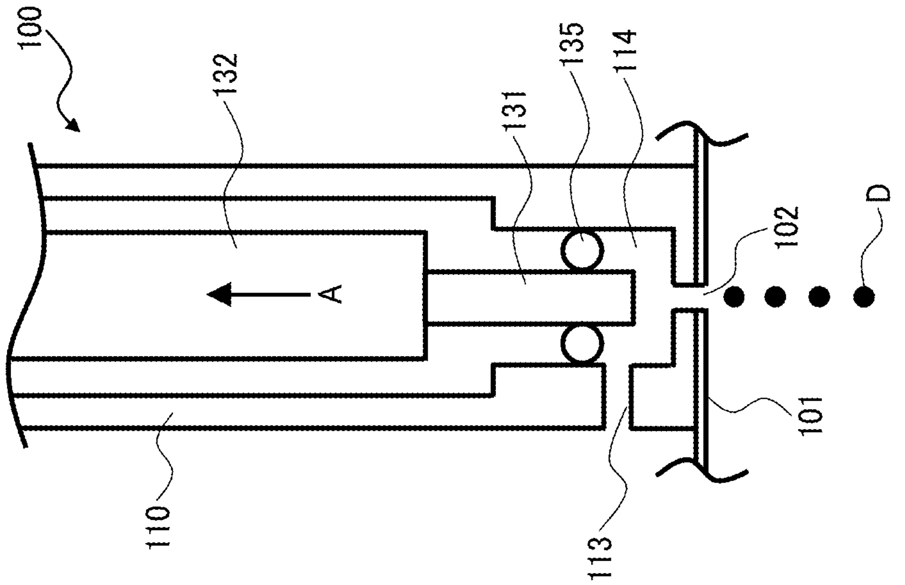

Next, a schematic configuration and operation of the head will be described with reference to FIGS. 3A and 3B. FIGS. 3A and 3B are diagrams describing a schematic configuration of the head. FIG. 3A is a schematic view of a main part, illustrating a state in which a nozzle is closed, and FIG. 3B is a schematic view of the main part illustrating a state in which the nozzle is opened.

Although the end effector 1004 of the coating robot 1000 is equipped with the head including a plurality of nozzles, FIGS. 3A and 3B illustrate a configuration of a head minimum unit (one nozzle).

The head 100 includes a hollow housing 110 and a nozzle plate 101 at one end portion of the housing 110. The nozzle plate 101 is a plate-like member in which a nozzle 102 for discharging a coating material is formed.

The housing 110 includes a supply port 113 through which a coating material is supplied, on the side surface close to the nozzle 102. The coating material supplied to the supply port 113 is sent to a liquid chamber 114 in the housing 110.

The liquid chamber 114 is generally formed by a space between the nozzle plate 101 and a sealing member 135 in the housing 110.

The sealing member 135 is made of an elastic body such as rubber, for example. In the present embodiment, a rubber O-ring is used as the sealing member 135, and the O-ring is fitted to a needle valve 131 so as to seal a gap between the inner surface of the housing 110 and the outer peripheral surface of the needle valve 131 in the liquid chamber 114. As a result, the sealing member 135 prevents the coating material in the liquid chamber 114 from flowing into a piezoelectric element 132.

The piezoelectric element 132 is provided in a space 110*a* of the housing 110 formed next to (above in FIG. 3) the liquid chamber 114 with the sealing member 135 as a boundary. The needle valve 131 is bonded to the piezoelectric element 132, and the piezoelectric element 132 moves the needle valve 131 between a position of closing the nozzle 102 and a position of opening the nozzle 102 according to an instruction from a head controller 902 described later. The leading end of the needle valve 131 is in contact with the nozzle plate 101 at the position of closing the nozzle 102, and the leading end of the needle valve 131 is separated from the nozzle plate 101 at the position of opening the nozzle 102. The piezoelectric element 132 is a piezoelectric element formed using zirconia ceramics or the like, and the shape and the like of the piezoelectric element 132 are set as appropriate according to the amount of a coating material to be discharged and the like.

In the above-described configuration, when a drive voltage (open-circuit voltage) is applied to the piezoelectric element 132, for example, the piezoelectric element 132 contracts in a direction of arrow A as illustrated in FIG. 3B. As the piezoelectric element 132 contracts, the needle valve 131 is separated from the nozzle plate 101. As a result, the nozzle 102 is opened, the nozzle 102 communicates with the liquid chamber 114, and the coating material in the liquid chamber 114 is discharged from the nozzle 102. The piezoelectric element 132 can open and close the nozzle 102 at a high speed at a frequency of 2 kHz, for example, and discharge the coating material as droplets D one by one.

When a drive voltage (close-circuit voltage) is applied to the piezoelectric element 132, the piezoelectric element 132 extends in the direction opposite to the arrow A. As the piezoelectric element 132 extends, the needle valve 131 comes into contact with the nozzle plate 101. As a result, the nozzle 102 is closed, the communication state between the nozzle 102 and the liquid chamber 114 is shut off, and the discharge of the coating material in the liquid chamber 114 is stopped.

Configuration Example of Head

Figure 4:
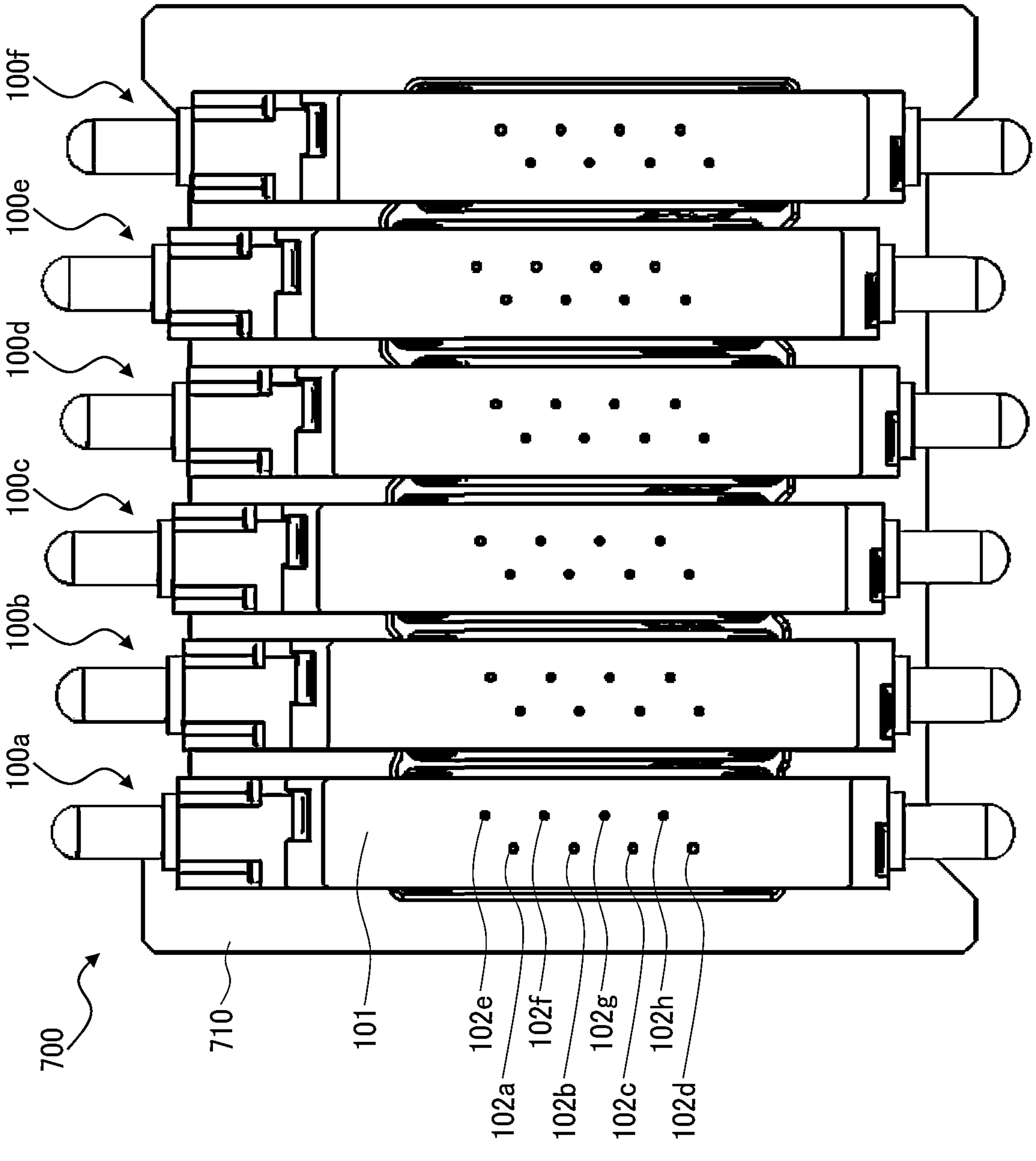
FIG. 4 is a diagram illustrating a configuration example of a head having a plurality of nozzles.

Next, configuration examples of the head will be described with reference to FIGS. 4 and 5. FIG. 4 is a diagram illustrating a configuration example of a head having a plurality of nozzles, which is a plan view of the head as seen from a nozzle plate side.

Figure 5:
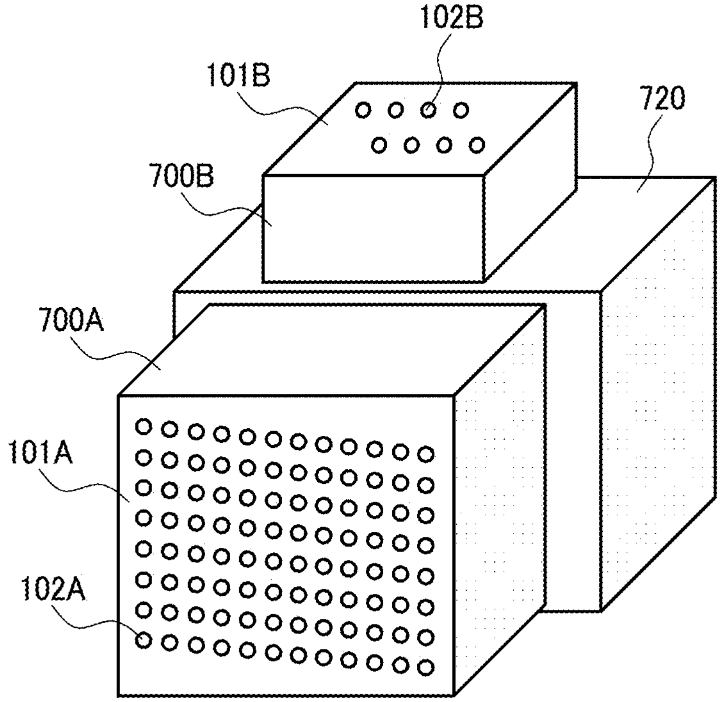
FIG. 5 is a perspective view of a configuration example of a head having two nozzle surfaces in which a plurality of nozzles is formed.

FIG. 5 is a perspective diagram illustrating a configuration example of a head having two nozzle surfaces in which a plurality of nozzles is formed.

Referring to FIG. 4, a multi-nozzle head 700 includes a plurality of (six in this example) sub-heads 100*a* to 100*f*. The sub-heads 100*a* to 100*f* include nozzle plates 101, and each nozzle plate 101 has a plurality of (eight in this example) nozzles 102*a* to 102*h* formed therein. That is, one sub-head includes substantially eight sets of the head illustrated in FIGS. 3A and 3B. Among the eight nozzles 102*a* to 102*h*, one nozzle row is formed by the nozzles 102*a*, 102*b*, 102*c*, and 102*d*, and another nozzle row is formed by the nozzles 102*e*, 102*f*, 102*g*, and 102*h*. The two nozzle rows are formed on the nozzle plate 101 so as to be alternately arranged as the nozzle 102*e*, the nozzle 102*a*, the nozzle 102*f*, the nozzle 102*b* . . . from the top in the drawing, and the plurality of nozzles are two-dimensionally arranged.

Each of the nozzles 102*a* to 102*h* is provided with the needle valve 131 and the piezoelectric element 132 as illustrated in FIGS. 3A and 3B. When a drive voltage (open-circuit voltage) is applied to the piezoelectric element 132, the needle valve 131 moves in a direction in which the nozzle 102 is opened, and the coating material is discharged from the nozzle 102.

The sub-heads 100*a* to 100*f* are attached to the housing 710 of the multi-nozzle head 700 with their respective positions slightly shifted in the vertical direction so that the nozzles 102*a* to 102*h* do not overlap one another. Accordingly, the space between the nozzle 102*e* and nozzle 102*a* of the sub-head 100*a* is interpolated by a nozzle of another sub-head, for example, thereby enabling recording at high resolution.

The multi-nozzle head 700 configured as described above can be attached to the end effector 1004 of the coating robot 1000, and enables a coating to the vehicle body U at high resolution.

The number of sub-heads and the number of nozzles illustrated in FIG. 4 are examples, and these numbers are not limited thereto. For example, the number of sub-heads may be less than or more than six. The number of nozzles in one nozzle plate 101 may be less than or more than eight. The number of nozzle rows in one nozzle plate 101 is not limited to two, and may be three or more.

The number of multi-nozzle head 700 is not limited to one, and a plurality of multi-nozzle heads 700 may be coupled in an array. For example, the multi-nozzle heads 700 may be attached in an array adjacent to the end effector 1004 of the coating robot 1000. This further increases the resolution of the coating.

Since the body of an automobile may include a complicated surface shape, multi-nozzle heads 700A and 700B different in the number of nozzles may be provided as illustrated in FIG. 5, and the multi-nozzle heads 700A and 700B may be selectively used according to the shape of the surface to be coated. For example, the multi-nozzle head 700A includes a nozzle surface 101A having 96 nozzles 102A, and the multi-nozzle head 700B includes a nozzle surface 101B having eight nozzles 102B.

The multi-nozzle head 700A and the multi-nozzle head 700B are held by a head holding member 720 with the nozzle surfaces 101A and 101B facing different directions. In the present embodiment, the nozzle surface 101A and the nozzle surface 101B are shifted by 90 degrees from each other. The nozzle surface 101B has a smaller area than the nozzle surface 101A, and has a size adaptable for applying a coating to a narrow portion of the vehicle body U.

In the above-described configuration, attaching the head holding member 720 to the end effector 1004 of the coating robot 1000 and switching between the multi-nozzle heads 700A and 700B according to the shape of the vehicle body U makes it possible to apply a coating to a complicated surface shape. The number and arrangement of the nozzles 102A and 102B are examples, and the number and arrangement are not limited thereto. In the present example, the nozzle surface 101A and the nozzle surface 101B face in different directions. However, the nozzle surface 101A and the nozzle surface 101B may face in the same direction.

Configuration Example of Medium Plate

Figure 6:
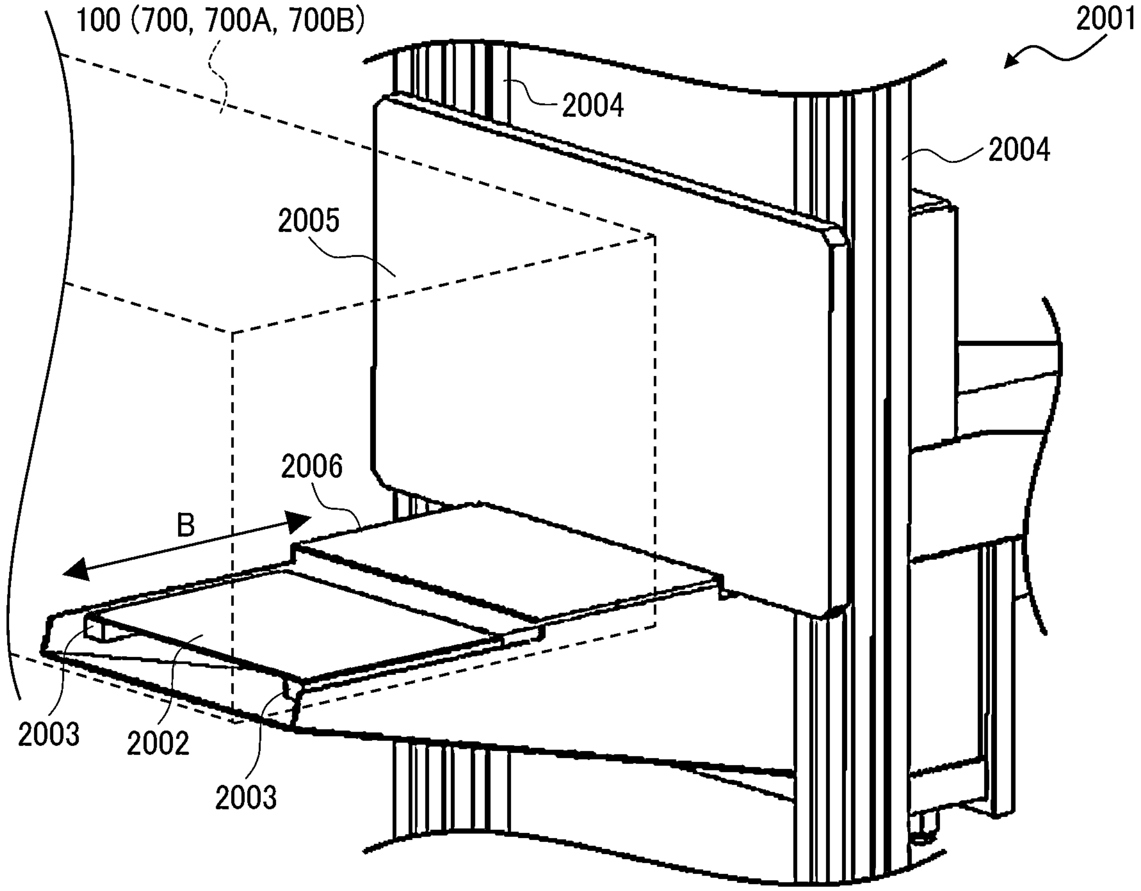
FIG. 6 is a diagram illustrating a configuration example of a medium plate.

Next, a configuration example of a medium plate will be described with reference to FIG. 6. FIG. 6 is a diagram illustrating a configuration example of a medium plate.

The maintenance/cleaning unit 2001 of the maintenance station 2000 includes a medium plate 2002 that holds a test pattern formed through a discharge operation performed by all the nozzles, before the coating or when the coating time has passed a predetermined time. Here, the medium plate 2002 is an example of a detection target member.

The medium plate 2002 is secured to a medium plate supporting member 2003 with screws or the like. A base plate 2005 is secured to a frame 2004 of the maintenance station 2000, and a cover member 2006 is attached to the frame 2004 with the base plate 2005 in between. The medium plate supporting member 2003 with the medium plate 2002 thereon can reciprocate in the directions of arrow B, and the medium plate supporting member 2003 can pass through the cover member 2006 to the rear side of the base plate 2005. A cleaning mechanism for removing the test pattern formed on the surface of the medium plate 2002 is provided on the rear side of the base plate 2005.

After the removal of the test pattern, the medium plate supporting member 2003 with the medium plate 2002 thereon passes through the cover member 2006 and moves to the front side of the base plate 2005 for formation of the next test pattern. At the time of formation of a test pattern on the medium plate 2002, the head 100 (700, 700A, 700B) is positioned directly above the medium plate 2002 as indicated by broken lines, and in this state, the discharge operation is executed by all the nozzles.

In the above description, the medium plate 2002 is provided in the maintenance station 2000. However, the medium plate 2002 may be placed at a location different from the maintenance station 2000.

Functional Configuration of Coating System

Figure 7:
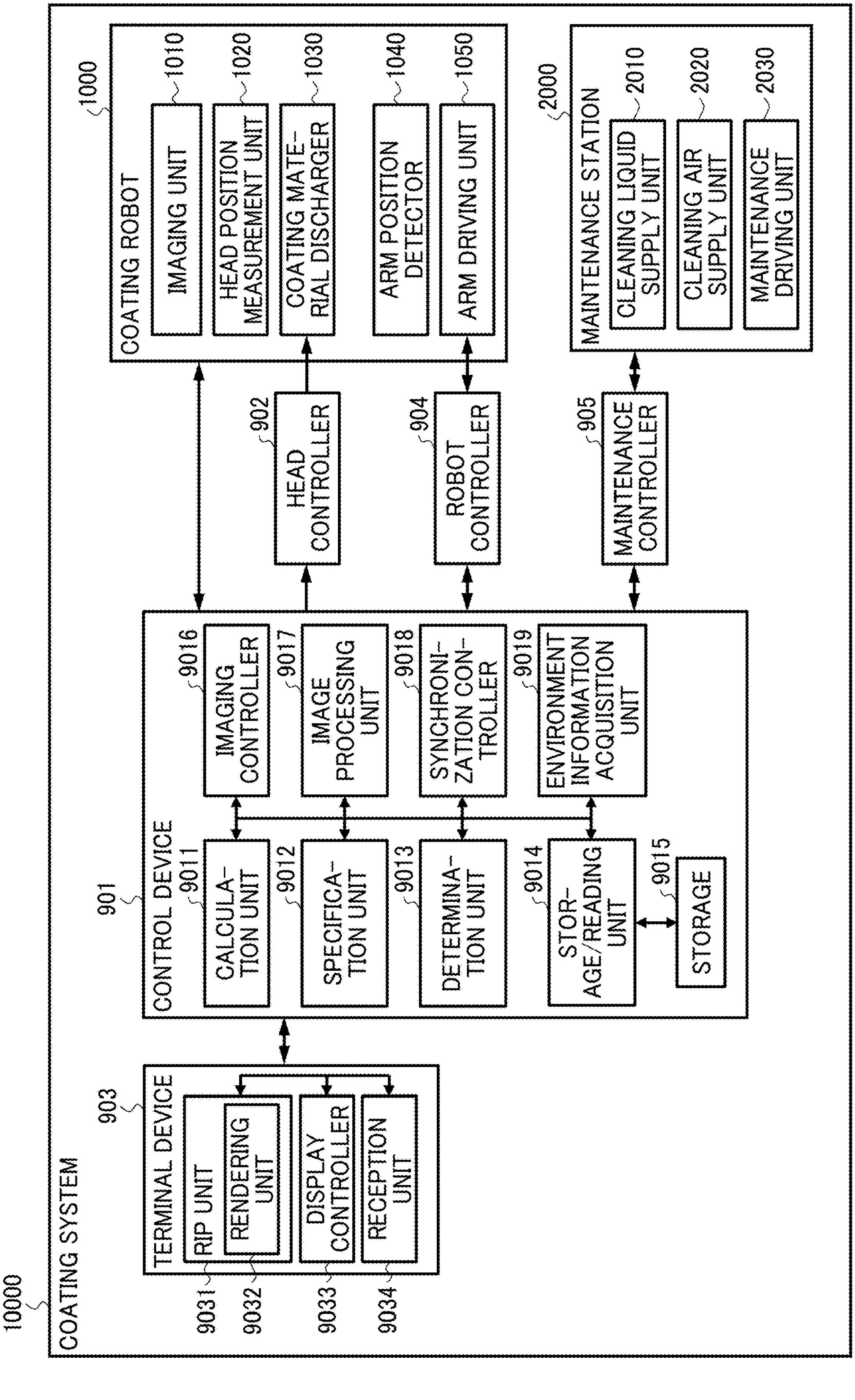
FIG. 7 is a diagram illustrating an example of a functional configuration of a coating system.

Next, a functional configuration of the coating system according to the embodiment will be described with reference to FIG. 7. FIG. 7 is a diagram illustrating an example of a functional configuration of the coating system.

In FIG. 7, the coating system 10000 includes a control device 901, a head controller 902, a terminal device 903, a robot controller 904, a maintenance controller 905, the coating robot 1000, and the maintenance station 2000.

The control device 901 includes a calculation unit 9011, a specification unit 9012, a determination unit 9013, a storage/reading unit 9014, a storage 9015, an imaging controller 9016, an image processing unit 9017, a synchronization controller 9018, an environment information acquisition unit 9019, and others.

The control device 901 receives coating data and instructions of the vehicle body U from the terminal device 903 and controls the entire operation of the coating system 10000.

The calculation unit 9011 is implemented through processing performed by a central processing unit (CPU) 9001 described later, and calculates the moving direction of the head 100 (700, 700A, 700B) in a coating area of the vehicle body U and the number of nozzles for discharging the coating material in the coating area, based on the coating data received from the terminal device 903.

The specification unit 9012 is implemented through processing performed by the CPU 9001 described later, and specifies the coating area of the vehicle body U based on the coating data received from the terminal device 903.

The determination unit 9013 is implemented through processing performed by the CPU 9001 described later, and makes various determinations.

The storage/reading unit 9014 is mainly implemented through processing performed the CPU 9001 described later, and stores various types of data (or information) in the storage 9015 and reads various types of data (or information) from the storage 9015.

The storage 9015 is constructed by a read only memory (ROM) 9002, a random access memory (RAM) 9003, a hard disk drive (HDD)/solid state drive (SSD) 9004, and the like described later, and stores the coating data, coating target range (coating target size) data, coating area data, coating specification data, and the like received from the terminal device 903.

The imaging controller 9016 is mainly implemented through processing performed by the CPU 9001 on an input/output (I/O) interface 9005 described later. For example, if the coating robot 1000 includes an imaging apparatus such as a camera, the imaging controller 9016 controls imaging processing on the imaging unit 1010 of the coating robot 1000.

For example, the imaging controller 9016 instructs the imaging unit 1010 to perform imaging processing. The imaging controller 9016 acquires a captured image obtained by imaging processing by the imaging unit 1010, for example.

The image processing unit 9017 is mainly implemented through processing performed by the CPU 9001 described later, and executes predetermined processing on the captured image acquired by the imaging controller 9016 from the imaging unit 1010. For example, the image processing unit 9017 executes predetermined processing on a trial shot image (an image obtained by capturing the test pattern) of the head 100 acquired by the imaging controller 9016, and generates image data used for determining the discharge state of the coating material.

The synchronization controller 9018 is implemented through processing performed by the CPU 9001 described later, and synchronizes the operation of the coating robot 1000 with the discharge operation of a coating material discharger 1030, based on the coating data, coating instructions, and the like received from the terminal device 903.

The environment information acquisition unit 9019 is mainly implemented through processing performed by the CPU 9001 on the I/O interface 9005 described later, and acquires temperature information indicating the environmental temperature in the coating system 10000, the temperature of the coating material, or the like, for example.

The head controller 902 controls the coating material discharging operation by the coating material discharger 1030 in response to an instruction from the control device 901.

The terminal device 903 includes a routing information protocol (RIP) unit 9031, a rendering unit 9032, a display controller 9033, and a reception unit 9034.

The RIP unit 9031 has a function of performing image processing in accordance with a color profile and user settings.

The rendering unit 9032 decomposes the coating data into image data for each scan (for example, for each movement of the head 100 in the main scanning direction).

The display controller 9033 is mainly implemented through processing performed by the CPU 9001 described later, and displays various screens on a display unit such as a display.

The reception unit 9034 is mainly implemented through processing performed by the CPU 9001 on the communication interface 9006, and receives various selections or inputs from the user. The reception unit 9034 receives settings of coating data and coordinate data to be applied to the vehicle body U, selection of a coating mode, setting of a coating range (coating start position and coating end position), a coating instruction, and the like, for example. The reception unit 9034 may include a touch panel.

The terminal device 903 generates a movement trajectory of the coating robot 1000, based on the coating data received by the reception unit 9034 and the position data acquired from a head position measurement unit 1020 included in the coating robot 1000.

The robot controller 904 controls driving of an arm driving unit 1050 in response to an instruction from the control device 901. The driving of the arm driving unit 1050 is controlled to move the first arm 1002, the second arm 1003, and the end effector 1004 (head 100) of the coating robot 1000 to desired positions. The robot controller 904 also transmits driving state information indicating the driving state of the arm driving unit 1050 to the control device 901.

The maintenance controller 905 controls a cleaning liquid supply unit 2010, a cleaning air supply unit 2020, and a maintenance driving unit 2030 of the maintenance station 2000, in response to an instruction from the control device 901.

The maintenance controller 905 also transmits operation state information indicating the operation state of the maintenance station 2000 to the control device 901.

The coating robot 1000 includes the imaging unit 1010, a head position measurement unit 1020, the coating material discharger 1030, an arm position detector 1040, and the arm driving unit 1050.

The imaging unit 1010 is implemented by, for example, an imaging device such as a camera installed near the head 100 attached to the coating robot 1000, and executes imaging processing in response to an instruction from the imaging controller 9016. The imaging unit 1010 also transmits the captured image obtained by the imaging processing in response to an instruction from the imaging controller 9016 to the control device 901.

The head position measurement unit 1020 is implemented by a sensor installed in the vicinity of the head 100 attached to the coating robot 1000, for example, and measures the position and posture (inclination with respect to the coating surface or the like) of the head 100 with respect to the surface (coating surface) of the vehicle body U. As the head position measurement unit 1020, a three-dimensional (3D) sensor, a 3D camera, a laser displacement meter, or the like can be used. For example, the 3D sensor or the 3D camera measures the position and inclination in the XY direction, detects the coating start position, and detects the coating target size. In addition, the laser displacement meter measures the Z direction, detects the distance to the coating surface, and detects the surface shape (curvature or the like) of the coating surface. The head position measurement unit 1020 also transmits the measurement results and the detection results to the control device 901.

The coating material discharger 1030 is implemented by the head 100 (700, 700A, 700B) attached to the coating robot 1000, and discharges a coating material in response to an instruction from the head controller 902. The coating material discharger 1030 is an example of a liquid discharger.

The arm position detector 1040 optically detects each slit of an encoder included in the first joint 1005, the second joint 1006, the third joint 1007, and the like, for example. The arm position detector 1040 detects the positions of the first arm 1002, the second arm 1003, and the end effector 1004 from their rotation amounts, and acquires three-dimensional position information of the end effector 1004.

The arm driving unit 1050 moves the first arm 1002, the second arm 1003, the end effector 1004 (head 100), and the like of the coating robot 1000 to desired positions in response to an instruction from the robot controller 904. The arm driving unit 1050 also transmits driving state information and the like indicating the driving states of the first arm 1002, the second arm 1003, the end effector 1004, and the like to the robot controller 904.

The maintenance station 2000 includes the cleaning liquid supply unit 2010, the cleaning air supply unit 2020, and the maintenance driving unit 2030. The maintenance station transmits, to the maintenance controller 905, operating state information indicating the states of supply operations by the cleaning liquid supply unit 2010 and the cleaning air supply unit 2020, and driving state information indicating the driving state of the maintenance driving unit 2030.

The cleaning liquid supply unit 2010 includes cleaning nozzles that blow a cleaning liquid Lc to the nozzle plate 101 and the nozzle 102 of the head 100 (700, 700A, 700B), and discharges the cleaning liquid in response to an instruction from the maintenance controller 905.

The cleaning air supply unit 2020 includes, for example, air nozzles that blow cleaning air to the nozzle plate 101 and the nozzle 102 of the head 100 (700, 700A, 700B), and discharges the cleaning air in response to an instruction from the maintenance controller 905.

The maintenance driving unit 2030 drives various movement mechanisms such as a movement mechanism that moves the cleaning nozzles or the air nozzles forward and backward with respect to the head 100 (700, 700A, 700B), a movement mechanism that moves a cleaning member that wipes and cleans the nozzle surface, and a movement mechanism that moves the dummy discharge receiver forward and backward with respect to the head 100. If the maintenance station 2000 includes a medium plate for causing the head 100 to make a test pattern, the maintenance driving unit 2030 drives a movement mechanism that moves the medium plate forward and backward with respect to the head 100.

In the case of installing a plurality of coating robots (1000A, 1000B, . . . ), the head controller 902 and the robot controller 904 are provided for each coating robot. The functions of the RIP unit 9031 and rendering unit 9032 in the terminal device 903, and the functions of the head controller 902, the robot controller 904, and the maintenance controller 905 may be provided in the control device 901.

Hardware Configuration of Control Device

Figure 8:
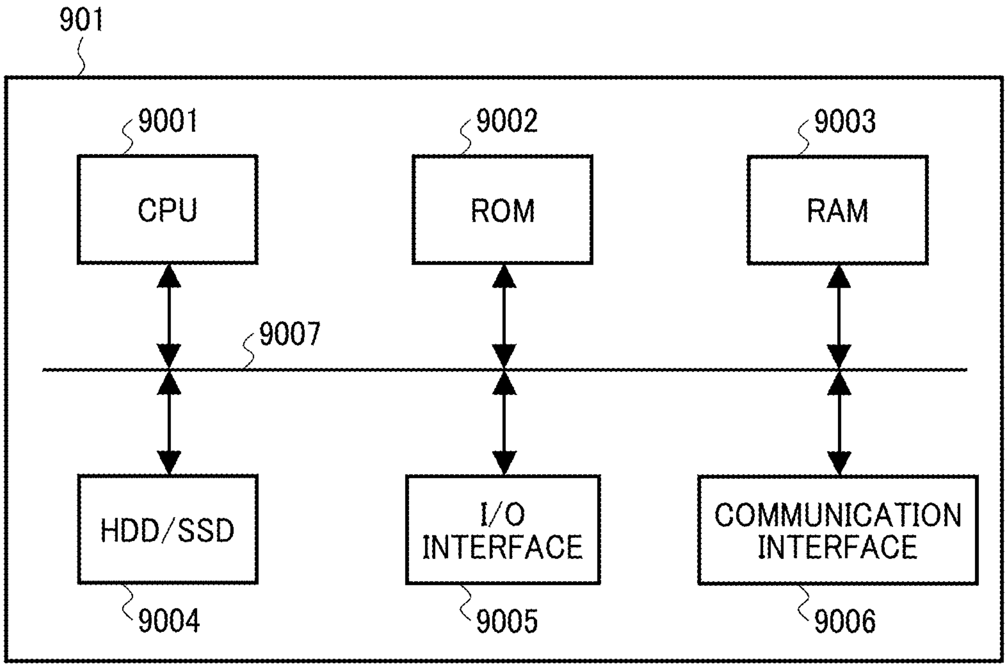
FIG. 8 is a diagram illustrating an example of a hardware configuration of a control device.

Next, a hardware configuration of the control device 901 will be described with reference to FIG. 8. FIG. 8 is an explanatory diagram illustrating an example of a hardware configuration of the control device. In the hardware configuration illustrated in FIG. 8, components may be added or deleted as necessary.

The control device 901 includes the central processing unit (CPU) 9001, the read only memory (ROM) 9002, the random access memory (RAM) 9003, the hard disk drive (HDD)/solid state drive (SSD) 9004, the input/output (I/O) interface 9005, the communication interface 9006, and a bus line 9007.

The CPU 9001 is an arithmetic device that implements each function of a target device or a target unit by reading a program or data stored in the ROM 9002 onto the RAM 9003 and executing processing.

The ROM 9002 is a non-volatile memory holding programs or data even after the power is turned off.

The RAM 9003 is a volatile memory used as a work area or the like of the CPU 9001.

The HDD/SSD 9004 controls reading or writing of various types of data under control of the CPU 9001.

The I/O interface 9005 is an interface for inputting/outputting to/from devices such as the coating robot 1000, the head controller 902, the robot controller 904, and the maintenance controller 905.

The communication interface 9006 is an interface that communicates (connects) with a device that performs data processing such as the terminal device 903 via a communication network.

The bus line 9007 is an address bus, a data bus, or the like for electrically connecting the above-described components, and transmits an address signal, a data signal, various control signals, and the like. The CPU 9001, the ROM 9002, the RAM 9003, the HDD/SSD 9004, the I/O interface 9005, and the communication interface 9006 are connected to one another via the bus line 9007.

Outline of Test Pattern

Figure 9B:
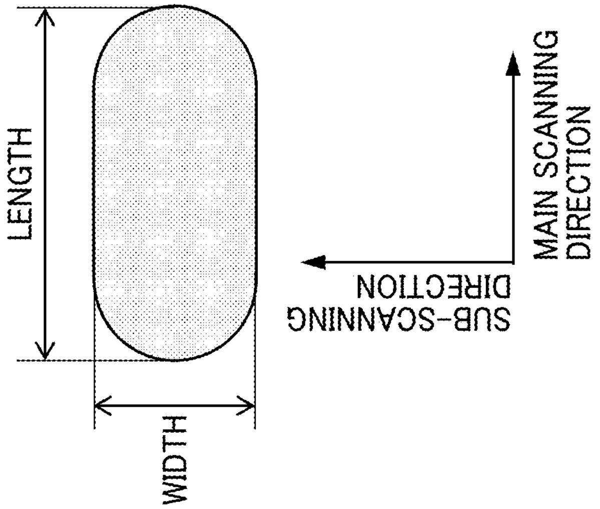
FIGS. 9A and 9B are explanatory diagrams illustrating an example of a test pattern.
Figure 9A:
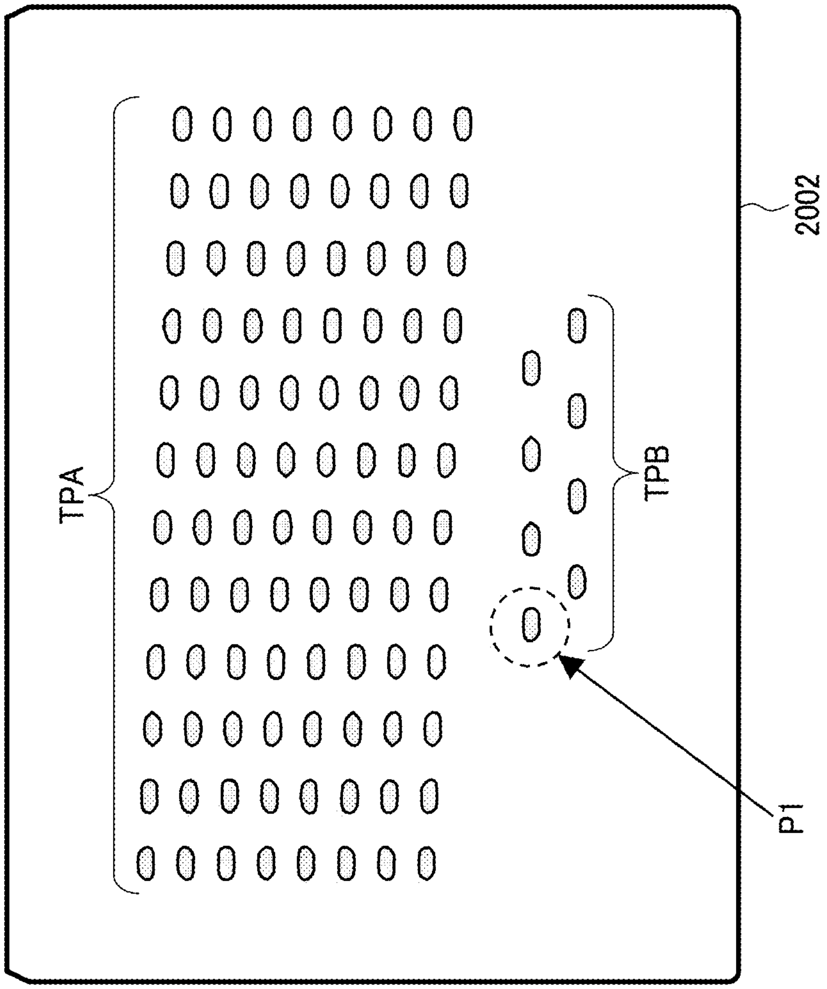

Next, an outline of a test pattern will be described with reference to FIGS. 9A to 11B. FIGS. 9A and 9B are explanatory diagrams illustrating an example of test pattern, FIGS. 10A to 10D are diagrams illustrating the relationship between the state of nozzles and the test pattern, and FIGS. 11A and 11B are diagrams illustrating the relationship between solid coating and nozzle bending.

FIG. 9A is a plan view of an example of the medium plate on which the test pattern is formed, and FIG. 9B is an enlarged view of a portion P in FIG. 9A.

FIG. 9A illustrates the test pattern formed on the medium plate 2002 by the multi-nozzle heads 700A and 700B illustrated in FIG. 5. In order to obtain this test pattern, the multi-nozzle head 700A is moved by the coating robot 1000 so that the nozzle surface 101A of the head faces the medium plate 2002, and all the nozzles 102A of the multi-nozzle head 700A execute the discharging operation. When all the nozzles 102A of the multi-nozzle head 700A are normal, a test pattern TPA as illustrated in FIG. 9A can be obtained.

Next, the head holding member 720 is rotated by 90 degrees by the coating robot 1000, so that the nozzle surface 101B of the multi-nozzle head 700B faces a region of the medium plate 2002 where the test pattern TPA is not formed. Next, all the nozzles 102B of the multi-nozzle head 700B execute the discharge operation. When all the nozzles 102B of the multi-nozzle head 700B are normal, a test pattern TPB as illustrated in FIG. 9A can be obtained.

In the following description, the length of the test pattern will be also referred to as “pattern length”, and the pattern length means the length of the test pattern in the main-scanning direction as illustrated in FIG. 9B. In addition, the width of the test pattern will be also referred to as “pattern width”, and the pattern width means the length of the test pattern in the sub-scanning direction as illustrated in FIG. 9B.

FIGS. 10A to 10D illustrate the relationship between the state of the nozzles and the test pattern. Here, the test pattern TPA formed by the multi-nozzle head 700A will be described as an example. Nozzle states as described below can be grasped from the test pattern TPA on the medium plate 2002.

The nozzle state is determined by comparing the area value of a preset reference pattern with the area value of the test pattern TPA on the medium plate 2002.

Figure 10A:
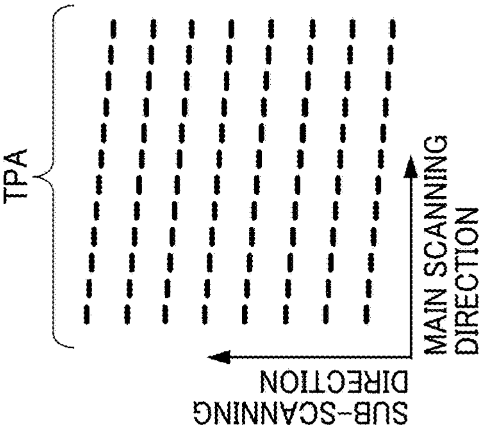
FIGS. 10A to 10D are diagrams describing the relationship between the state of the nozzles and the test pattern.
Figure 11A:
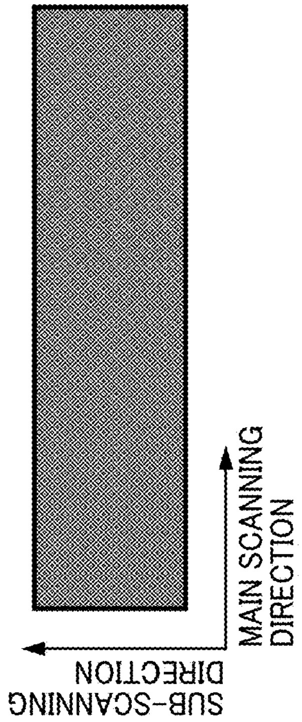
FIGS. 11A and 11B are diagrams describing the relationship between solid coating and nozzle bending.
Figure 11B:
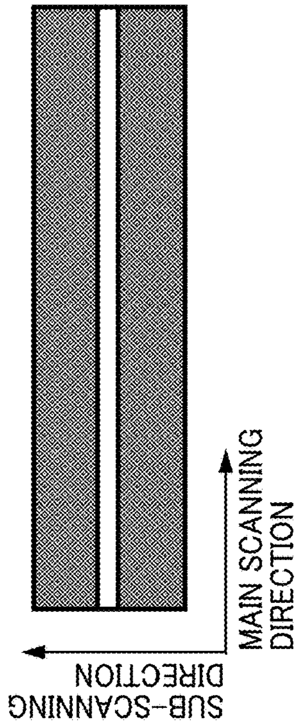

FIG. 10A illustrates a normal state. In this case, since the area value of the reference pattern and the area value of the test pattern TPA are equal, the control device 901 determines that the nozzles are normal.

Figure 10B:
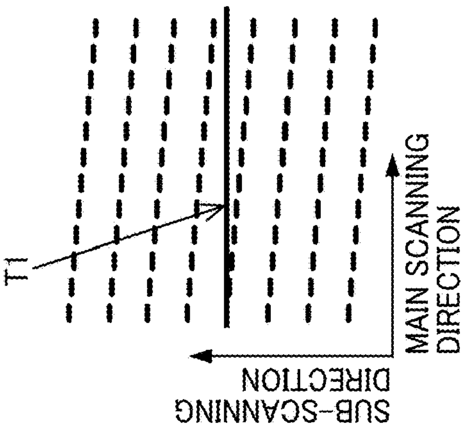

FIG. 10B illustrates a constant discharge state. In this case, for example, one nozzle continues to discharge the coating material, and thus one line T1 appears in the test pattern TPA. As a result, since the area value of the test pattern TPA is larger than the area value of the reference pattern, the control device 901 determines that there is a nozzle that has been in the constant discharge state.

Figure 10C:
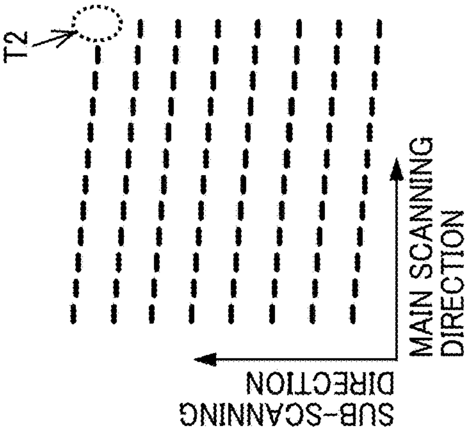

FIG. 10C illustrates a non-discharge state. In this case, for example, since one nozzle did not discharge the coating material, a blank T2 appears in the test pattern TPA. As a result, since the area value of the test pattern TPA is smaller than the area value of the reference pattern, the control device 901 determines that there is a nozzle that has been in the non-discharge state.

Figure 10D:
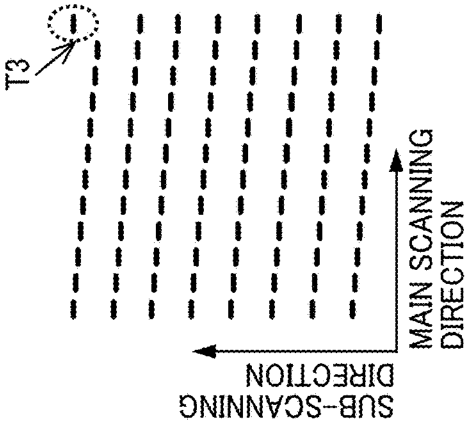

FIG. 10D illustrates a bending state. In this case, the coating material discharged from a nozzle did not correctly land on the target position, and a pattern T3 appears as a positional shift in the test pattern TPA. In the case of the bending state, since the area value of the test pattern TPA is equal to the area value of the reference pattern, it is difficult to detect the bend by the method of comparing the area values. Therefore, for the bending state, reference data on a state with no bend is acquired in advance, and the bending amount of the pattern is measured by comparing the barycentric position of the reference data with the barycentric position of each pattern constituting the test pattern TPA. As a result of the measurement, if the bending amount exceeds a prescribed value, the control device 901 determines that the test pattern is in the bending state. FIG. 10D illustrates the position of the pattern T3 that is greatly shifted for easy understanding of the phenomenon, but the actual shift amount (bending amount) is minute.

FIGS. 11A and 11B illustrate a case where solid coating is applied by a normal nozzle (FIG. 11A) and a case where solid coating is applied by a bending nozzle (FIG. 11B). When the nozzle is bent in the sub-scanning direction, a portion where the coating material did not land appears as a streak extending in the main-scanning direction as illustrated in FIG. 11B. Naturally, a discharge target object (a vehicle body or the like) with a streak is a defective product.

As described above, the constant discharge state and the non-discharge state are determined based on the area value of the test pattern, whereas the bending state of the nozzle is determined based on the barycentric position of the test pattern. Moreover, since the bending amount of the nozzle (shift amount of the barycentric position) is minute, high accuracy is required for detecting the shift amount of the barycentric position.

Detection of Nozzle Bend

Figure 12A:
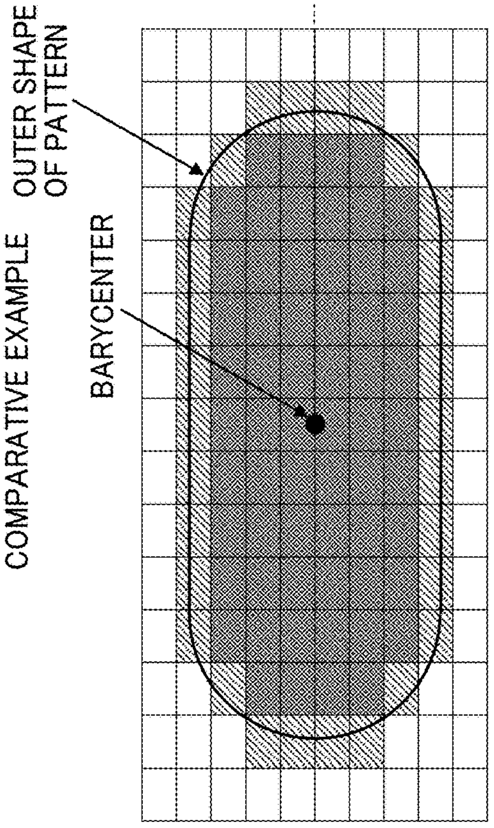
FIGS. 12A and 12B are diagrams illustrating an example of bend detection in a comparative example.
Figure 12B:
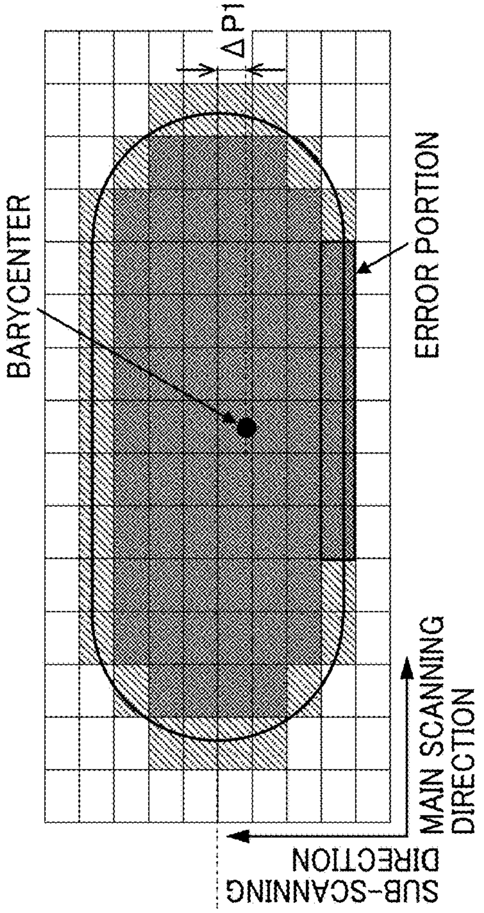
Figure 13B:
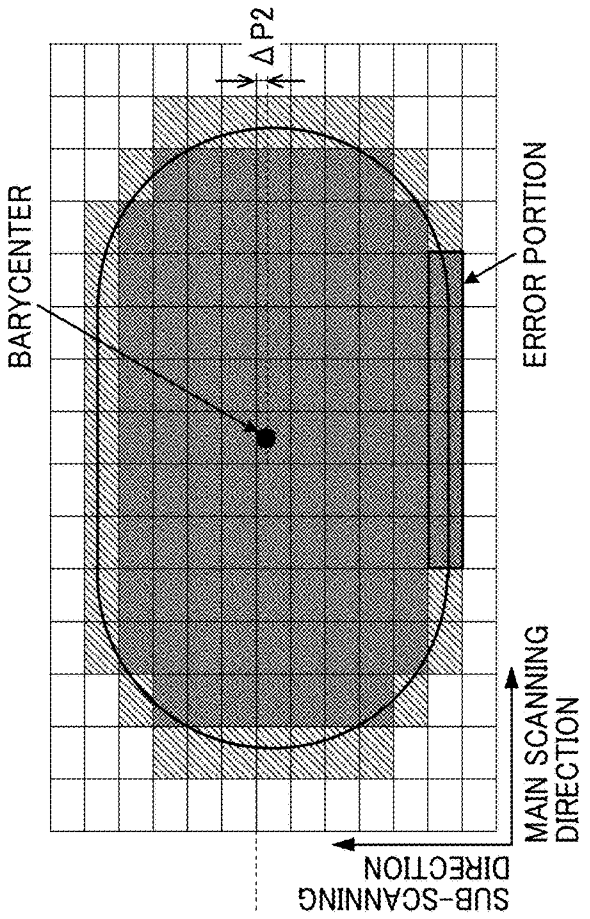
FIGS. 13A and 13B are diagrams illustrating an example of bend detection in the embodiment.
Figure 13A:
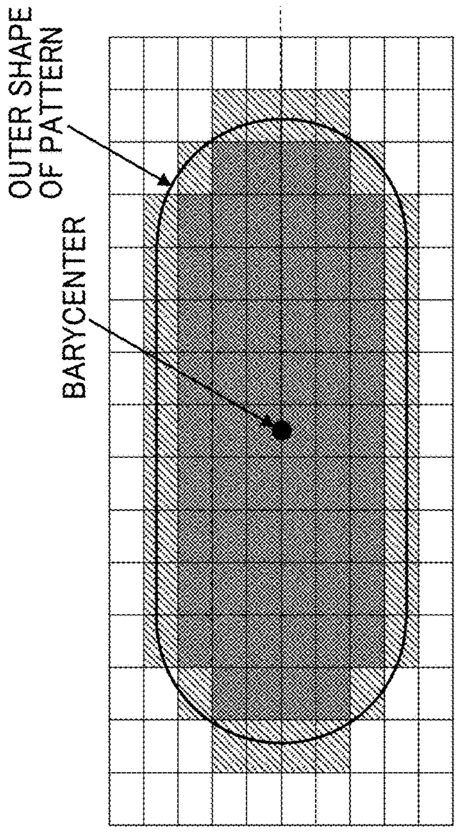

A method of detecting a nozzle bend will be described with reference to FIGS. 12A to 13B. FIGS. 12A and 12B are diagrams illustrating an example of bend detection in a comparative example, and FIGS. 13A and 13B are diagrams illustrating an example of bend detection in the embodiment.

FIG. 12A illustrates a pattern shape to be originally acquired. The oval indicated by solid line represents the outer shape of the pattern, and the coating material is discharged from the nozzles so as to follow the solid line, thereby to form a pattern on the medium plate 2002. The pattern (test pattern) formed on the medium plate 2002 is captured (acquired) by the imaging unit 1010 of the coating robot 1000, for example. The image processing unit 9017 of the control device 901 performs predetermined image processing on the test pattern image acquired by the imaging unit 1010.

In the image processing, it is desired to recognize an area (gray area) inside the solid line as a pattern. However, there is an area (hatched area) that is recognized or not recognized depending on the resolution or the like of the imaging unit 1010 around the gray area. Therefore, the actually recognized pattern may be a pattern including an error portion as illustrated in FIG. 12B, for example. When the pattern including the error portion is recognized as the pattern, the barycentric position of the pattern moves to the negative side by ΔP1 in the sub-scanning direction. As a result, in the comparative example, the control device 901 may determine that the nozzle is bent even though the nozzle is actually not bent, which may cause a decrease in the accuracy of detecting the barycentric position.

In contrast to the comparative example described above, in the present embodiment, a test pattern is formed on the medium plate such that the amount of coating material per unit area is larger than that in the case of applying a coating material to the vehicle body U.

FIG. 13A illustrates a pattern that is formed with the amount of a coating material to be applied to the discharge target object (vehicle body U). At the time of forming the test patterns TPA and TPB on the medium plate 2002, the liquid amount per unit area is made larger than that in the case of applying a coating material to the vehicle body U, thereby to increase the pattern width as illustrated in FIG. 13B. Increasing the pattern width makes the area per pattern large and decreases the proportion of the error portion in the area of the pattern.

Accordingly, a movement amount ΔP2 of the barycentric position in the sub-scanning direction is smaller than the movement amount ΔP1 in the case of the comparative example, and as a result, the detection accuracy of the barycentric position in the sub-scanning direction can be improved. Examples of a method of increasing the liquid amount per unit area at the time of forming the test pattern include increasing the discharge amount (Mj) of the coating material from the nozzles, reducing the distance between the dots (droplets) of the coating material discharged from the nozzles, and the like.

As described above, the present embodiment is the coating system 10000 including the coating material discharger 1030 (head 100, 700, 700A, 700B) that discharges the coating material from the nozzle 102 to form the test patterns TPA and TPB on the medium plate 2002, the imaging unit 1010 that captures the test patterns TPA and TPB to acquire the test pattern image, the image processing unit 9017 that performs the image processing on the test pattern image acquired by the imaging unit 1010, and the determination unit 9013 that determines the presence or absence of abnormality in the nozzle 102 based on the results of processing by the image processing unit 9017. The test patterns TPA and TPB are formed on the medium plate 2002 such that the amount of the coating material per unit area is larger than that in the case where the coating material discharger 1030 discharges the coating material to the vehicle body U.

As described above, the test patterns TPA and TPB are formed such that the discharge amount (Mj) of the coating material from the nozzle 102 is larger than that in the case where the coating material discharger 1030 (head 100, 700, 700A, 700B) discharges the coating material to the vehicle body U.

As described above, the test patterns TPA and TPB are formed such that the inter-dot distance of the coating material is shorter than that in the case where the coating material discharger 1030 (head 100, 700, 700A, 700B) discharges the coating material to the vehicle body U.

The CPU 9001 (circuitry) causes the liquid discharger 1030 to discharge a first discharge amount of the liquid from the nozzle 102 onto the vehicle body U (target object); and causes the liquid discharger 1030 to discharge a second discharge amount of the liquid larger than the first discharge amount from the nozzle 102 onto the medium plate 2002 (detection target member) to form the test pattern on the medium plate 2002 (detection target member).

The CPU 9001 (circuitry) causes the liquid discharger 1030 to discharge the liquid from the nozzle 102 onto the vehicle body U (target object) multiple times to form multiple dots each having a first inter-dot distance with adjacent dot; and causes the liquid discharger 1030 to discharge the liquid from the nozzle 102 onto the medium plate 2002 (detection target object) multiple times to form multiple dots each having a second inter-dot distance shorter than the first inter-dot distance with adjacent dot.

The CPU 9001 (circuitry) reduces the second inter-dot distance in response to a change in the environmental temperature that decreases a discharge amount of the liquid from the liquid discharger 1030; and increase the second inter-dot distance in response to a change in the environmental temperature that increases the discharge amount of the liquid from the liquid discharger 1030.

Accordingly, even if the pattern is recognized in the shape including the error portion, the movement amount of the barycentric position of the pattern is decreased, and the detection accuracy of a nozzle bend based on the positional shift of the barycentric position can be improved.

Cleaning Liquid Handling

Next, handling of a defect caused by the cleaning liquid will be described with reference to FIGS. 14A to 18.

Figures 14A, 14B, 14C:
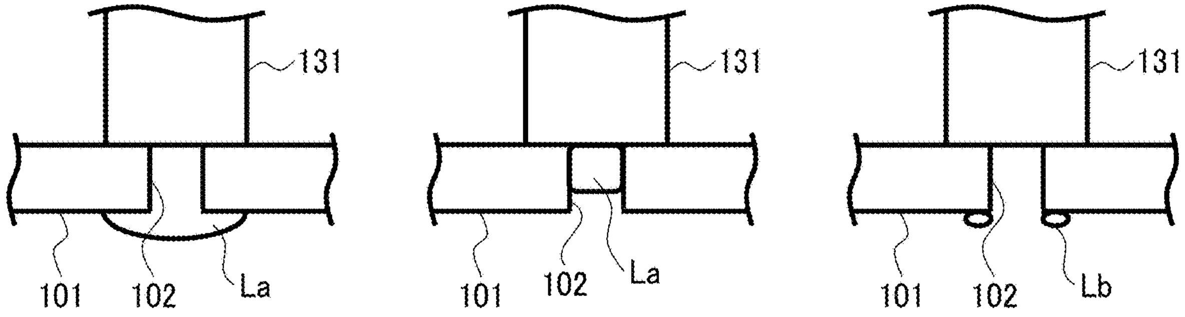
FIG. 14A to 14C are diagrams describing a state of nozzle contamination.
Figure 15:
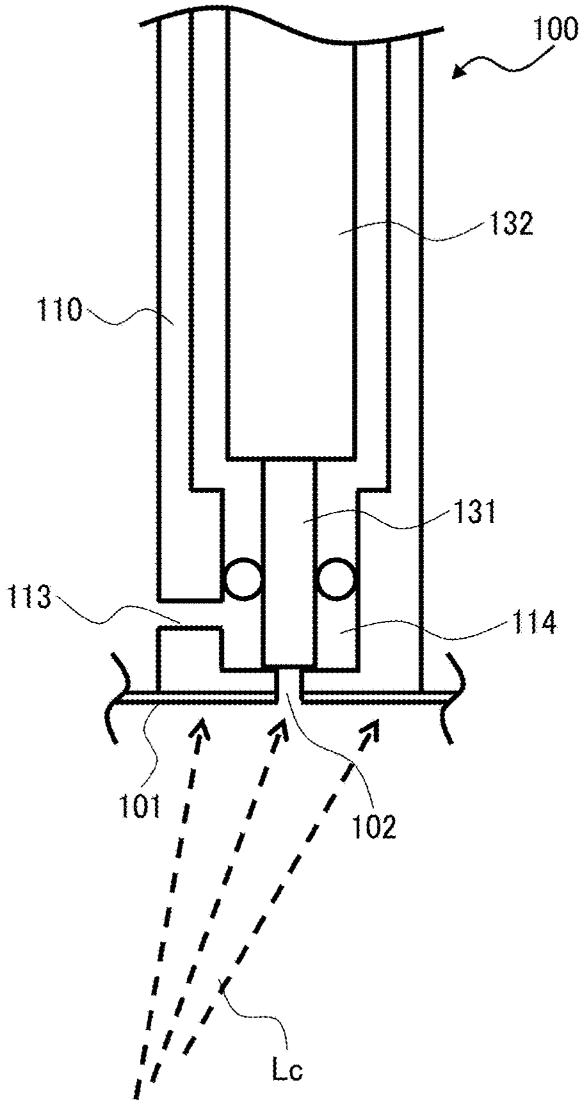
FIG. 15 is a diagram describing nozzle cleaning.
Figure 16A:
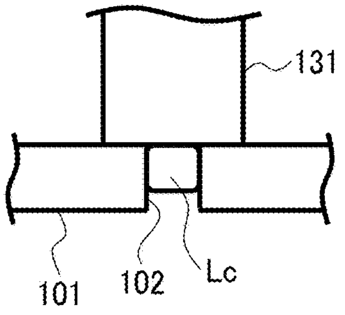
FIGS. 16A and 16B are diagrams describing a defect caused by the cleaning liquid to the test pattern.
Figure 16B:
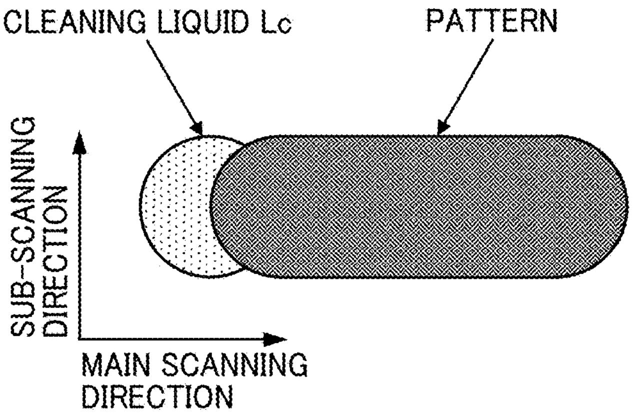
Figure 17A:
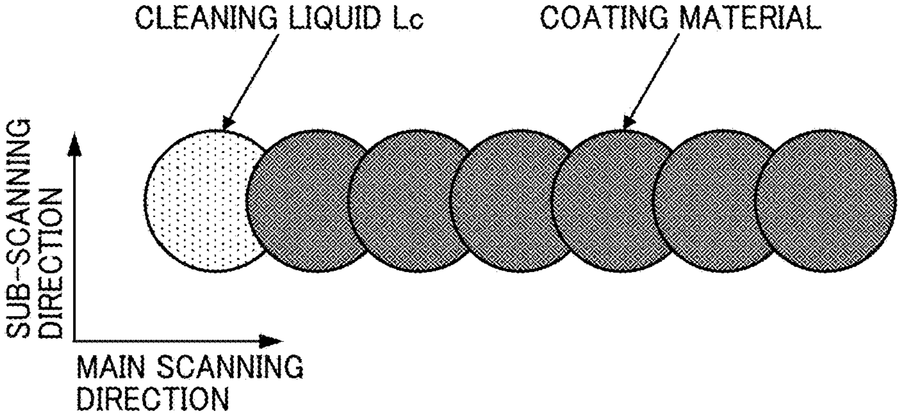
FIGS. 17A and 17B are diagrams illustrating an example of forming a test pattern.
Figure 17B:
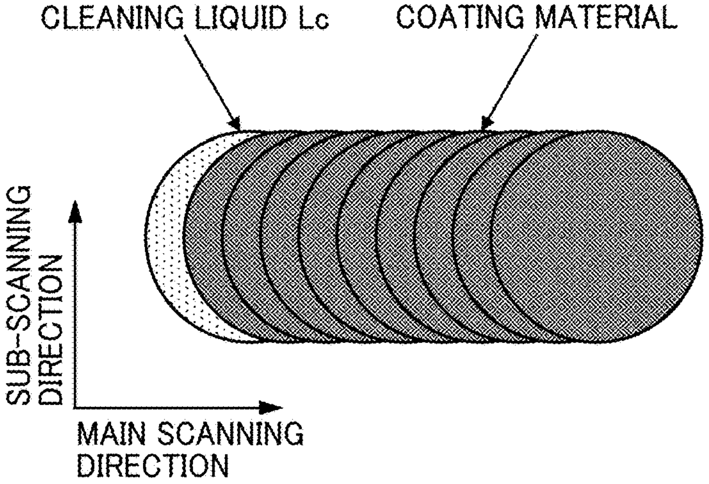
Figure 18:
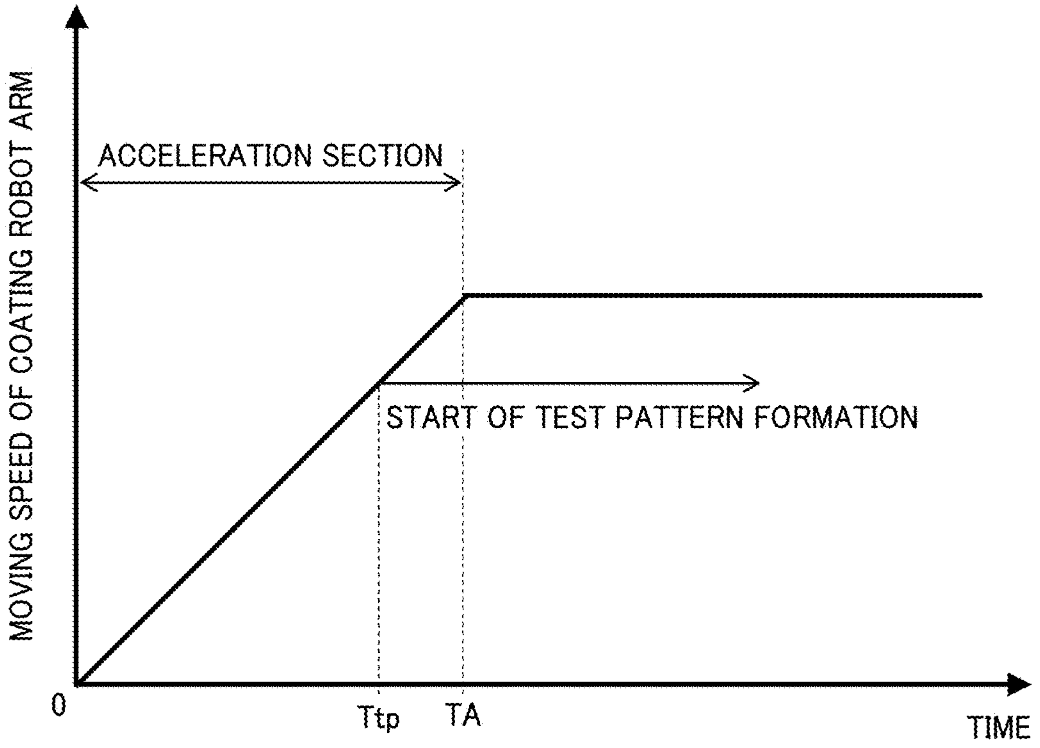
FIG. 18 is a diagram illustrating an example of forming a test pattern.

FIGS. 14A to 14C are diagrams describing a state of nozzle contamination, FIG. 15 is a diagram describing nozzle cleaning, FIGS. 16A and 16B are diagrams describing a defect caused by the cleaning liquid to the test pattern, and FIGS. 17A to 18 are diagrams illustrating examples of test pattern formation.

In the case of using a valve opening/closing head that discharges the coating material with nozzle opening/closing by the needle valves 131 as in the embodiment, since the nozzle 102 are closed by the needle valve 131 before the start of discharge, the coating material in the liquid chamber 114 is not dried or thickened. However, once discharge is performed, a thickened coating material La may remain on the nozzle 102 and the nozzle plate 101 as illustrated in FIGS. 14A and 14B. In addition, a residual liquid may adhere to the periphery of the nozzle 102 due to mist generated at the time of discharge, and may remain as an adhesion substance Lb as illustrated in FIG. 14C.

The thickened liquid La and the adhesion substance Lb become resistance to discharge of the coating material from the nozzle 102, cause discharge bending of the coating material, so that the coating material cannot be correctly discharged to a target position. In addition, if the liquid La is heavily thickened, discharge failure may occur (the liquid cannot be discharged from the nozzle 102). Therefore, in order to maintain the discharge quality, it is necessary to remove the thickened liquid La and the adhesion substance Lb.

The thickened liquid La and the adhesion substance Lb are removed by wiping (or scraping) the surface of the nozzle plate 101, for example. Alternatively, the thickened liquid La and the adhered substance Lb are removed by performing a dummy discharge (also referred to as preliminary discharge, spitting, and the like) of periodically discharging liquid droplets that do not contribute to coating to wash out the thickened liquid La and the adhered substance Lb from the nozzle 102, for example. Alternatively, the thickened liquid La and the adhered substance Lb are removed by cleaning the nozzle plate 101 and the nozzle 102, for example.

In the present embodiment, the nozzle plate 101 and the nozzle 102 are cleaned by blowing a pressurized cleaning liquid Lc from the cleaning nozzle to the nozzle plate 101, for example. In cleaning the nozzle 102, the leading end of the needle valve 131 is brought into contact (close contact) with the nozzle 102 as illustrated in FIG. 15, and the cleaning liquid Lc is sprayed onto the nozzle 102 in the closed state. This makes it possible to wash away the foreign matter such as the adhesion substance Lb and the thickened liquid La adhering to the nozzle plate 101 and the nozzle 102, and to maintain the discharge quality of the head 100. A head maintenance mechanism such as a cleaning liquid supply mechanism is provided in the maintenance/cleaning unit 2001 of the maintenance station 2000 illustrated in FIG. 2.

However, if the nozzle plate 101 and the nozzle 102 are cleaned with the cleaning liquid, the cleaning liquid Lc may remain in the nozzle 102 as illustrated in FIG. 16A. If a test pattern is formed on the medium plate 2002 with the cleaning liquid Lc remaining in the nozzle 102, the cleaning liquid Lc appears at the beginning of the test pattern as illustrated in FIG. 16B, and the shape of the pattern may not be correctly recognized.

For example, if the cleaning liquid Lc lands at a position where the coating material should land as the first drop, the pattern length in the main-scanning direction becomes shorter than the pattern length of the pattern shape to be acquired, and thus correct determination cannot be performed. In addition, if a pattern shape to be acquired is formed after the dropping of the cleaning liquid Lc from the nozzle and the cleaning liquid Lc is recognized as a pattern, the pattern length in the main scanning direction becomes longer than the pattern shape to be acquired, so that correct determination cannot be performed.

In this case, it is conceivable to perform a dummy discharge before executing the test pattern forming operation to wash out the foreign matter from the nozzle 102. However, time and equipment for the dummy discharge are required with cost increase.

In the above description, as an example of a method of increasing the amount of liquid per unit area at the time of forming the test pattern, decreasing the inter-dot distance of the coating material discharged from the nozzle has been exemplified. This method is also effective against the above-described defects caused by the cleaning liquid.

FIG. 17A illustrates a pattern that is formed with the amount of a coating material to be applied to the discharge target object (vehicle body U), and illustrates a state in which the cleaning liquid Lc is discharged as the first drop. In this state, the droplet of the cleaning liquid Lc is likely to cause a failure of the test pattern recognition.

On the other hand, if a pattern is formed with the shortened inter-dot distance of the droplets as illustrated in FIG. 17B, most of the droplet portion of the cleaning liquid Lc is hidden by the coating material dropped as the second droplet, so that the droplet portion of the cleaning liquid Lc is unlikely to be erroneously recognized as a pattern. This makes it possible to suppress the influence of the cleaning liquid without a dummy discharge.

In the formation of a test pattern with the inter-dot distance shortened, if the discharge frequency of the head is constant, the formation of a test pattern may be started while the arm movement speed of the coating robot including the head is in an acceleration section TA (for example, time Ttp) as illustrated in FIG. 18. Also in this case, since the inter-dot distance of the first drop and the second drop is shortened, the same effect as in the case of FIG. 17B can be obtained.

Handling of Environmental Temperature and Coating Material Replacement

Figure 19A:
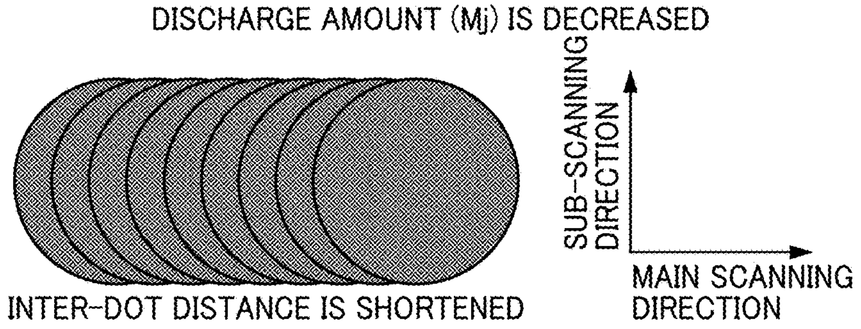
FIGS. 19A and 19B are diagrams describing an adjustment example of an inter-dot distance.
Figure 19B:
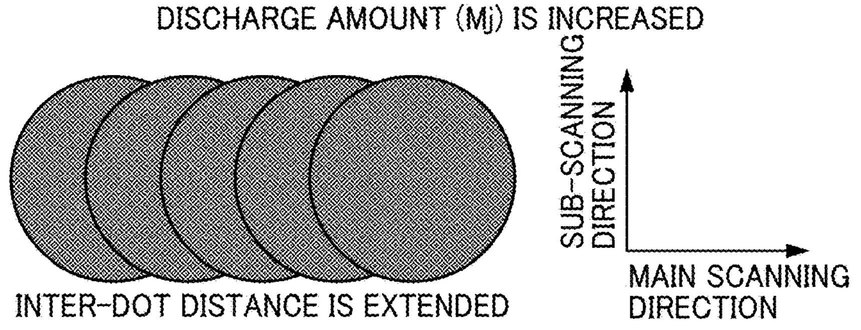

Next, handling of a change in the environmental temperature or replacement of the coating material used will be described with reference to FIGS. 19A and 19B. FIGS. 19A and 19B are diagrams illustrating adjustment examples of the inter-dot distance.

If the environmental temperature at the time of coating changes, the discharge amount (Mj) of the coating material from the nozzle 102 may change unless the discharge condition in the coating material discharger 1030 (head 100, 700, 700A, 700B) is changed. In the embodiment, the environment information acquisition unit 9019 acquires temperature information indicating the environmental temperature in the coating system 10000, the temperature of the coating material, or the like, and adjusts the inter-dot distance of the test pattern based on the acquired temperature information so that the pattern width is kept constant.

Specifically, if the discharge amount decreases due to a change in environmental temperature, the test pattern is formed with the inter-dot distance shortened as illustrated in FIG. 19A. On the other hand, if the discharge amount increases due to a change in environmental temperature, the test pattern is formed with the inter-dot distance extended as illustrated in FIG. 19B. This keeps the pattern width constant. Automatically adjusting the inter-dot distance makes it possible to detect the state of the nozzle with high accuracy without lowering the detection accuracy.

In the coating system 10000 of the embodiment, the coating material to be used is replaced in the head 100 (700, 700A, 700B). For example, the color is changed. If the coating material to be used is replaced with a different type of coating material, the discharge amount (Mj) of the coating material from the nozzle 102 may change due to a difference in characteristics between the coating materials unless the discharge condition in the coating material discharger 1030 (head 100, 700, 700A, 700B) is changed.

In the embodiment, for example, coating material information indicating the characteristics of the coating material used in the coating system 10000 is stored in advance in the storage 9015. When the user selects the coating material in the terminal device 903, the storage/reading unit 9014 reads the coating material information corresponding to the coating material selected by the user from the storage 9015, and the specification unit 9012 specifies the inter-dot distance of the test pattern based on the read coating material information. The control device 901 adjusts the inter-dot distance of the test pattern based on the result of the specification by the specification unit 9012 so that the pattern width is kept constant.

Specifically, if the discharge amount is decreased by replacing the coating material with a different type of coating material, the test pattern is formed with the inter-dot distance shortened as illustrated in FIG. 19A. Conversely, if the discharge amount is increased by replacing the coating material with a different type of coating material, the test pattern is formed with the inter-dot distance extended as illustrated in FIG. 19B. This keeps the pattern width constant. Automatically adjusting the inter-dot distance makes it possible to detect the state of the nozzle with high accuracy without lowering the detection accuracy.

As described above, in the present embodiment, the inter-dot distance is changed according to the environmental temperature.

As described above, the test pattern is formed with the inter-dot distance shortened if the environmental temperature changes such that the discharge amount of the coating material from the coating material discharger 1030 decreases, and if the environmental temperature changes such that the discharge amount of the coating material from the coating material discharger 1030 increases, a test pattern is formed with the inter-dot distance extended.

As described above, the inter-dot distance is changed according to the type of the coating material.

As described above, if the discharge amount of the coating material from the coating material discharger 1030 decreases due to the replacement of the coating material with a different type of coating material, the test pattern is formed with the inter-dot distance shortened, and if the discharge amount of the coating material from the coating material discharger 1030 increases due to the replacement of the coating material with a different type of liquid, the test pattern is formed with the inter-dot distance extended.

Accordingly, the pattern width is kept constant, and the state of the nozzle can be constantly detected with high accuracy.

Flow of Abnormality Determination

Figure 20:
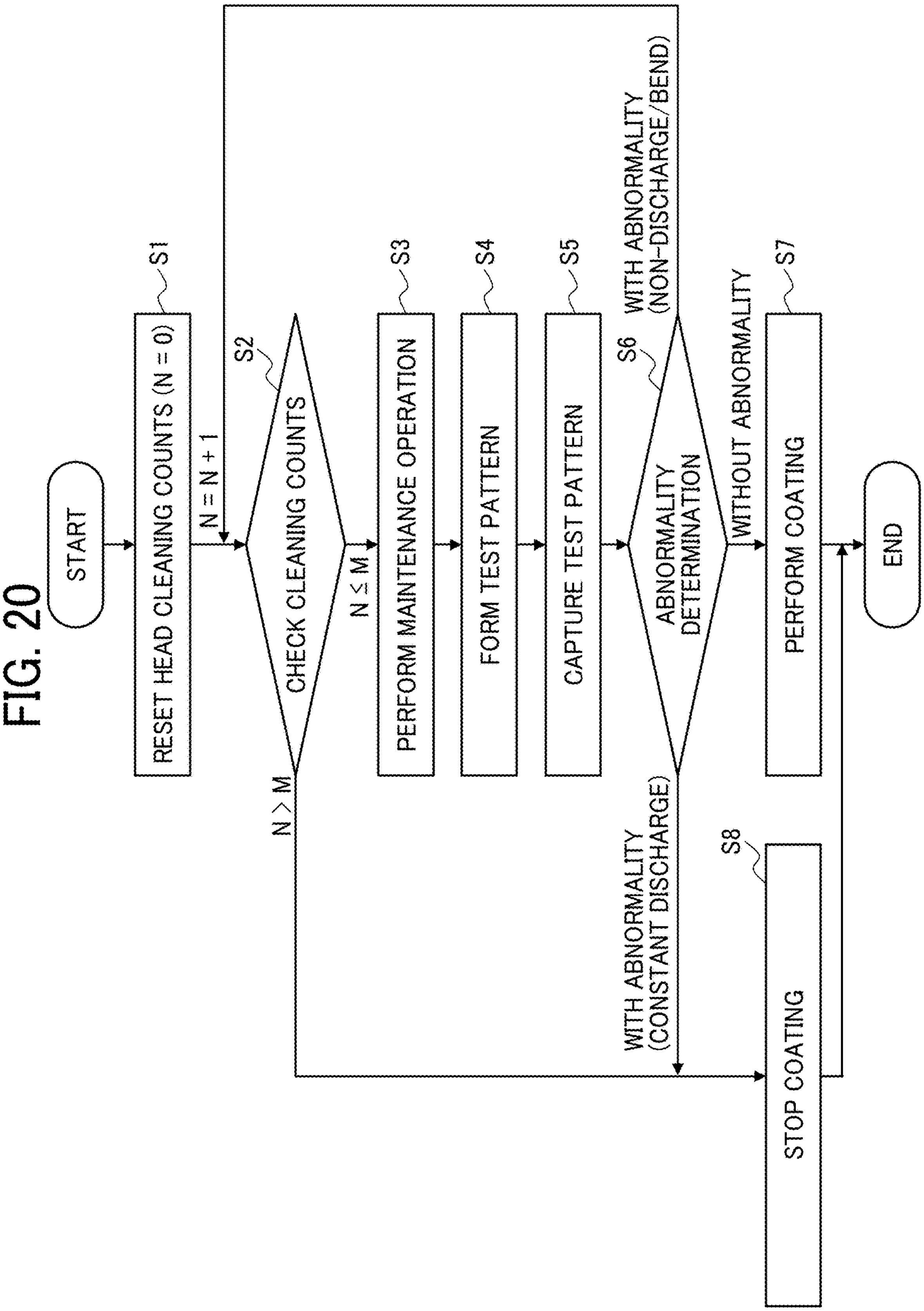
FIG. 20 is a flowchart illustrating an example of abnormality determination.

A flow of abnormality determination in the embodiment will be described with reference to FIG. 20. FIG. 20 is a flowchart illustrating an example of abnormality determination.

In the abnormality determination, first, the number of counts of cleaning the head 100 (700, 700A, 700B) attached to the end effector 1004 of the coating robot 1000 is reset (step S1). Next, the number of counts of cleaning the head 100 (700, 700A, 700B) is checked (step S2).

If it is determined in step S2 that the number of cleaning counts exceeds a predetermined value M (N>M), the coating is stopped (step S8) and the process is ended (system stop). This means that cleaning was performed M times, but the abnormal state was not eliminated by cleaning alone. If it is determined in step S2 that the number of cleaning counts is equal to or less than the predetermined value M (N≤M), a maintenance operation is performed on the head 100 (700, 700A, 700B) (step S3).

If the process is executed from step S1, the number of counts of cleaning N is always equal to or less than M. In this case, step S2 may be skipped, and step S3 (maintaining operation) may be executed. In step S3 (maintenance operation), the maintenance operation is executed as appropriate by means such as wiping of the nozzle surface of the head (surface of the nozzle plate 101), dummy discharge of the head, or cleaning of the nozzle surface with cleaning liquid or cleaning air.

Next, the head 100 (700, 700A, 700B) moves to a position facing the medium plate 2002, and discharges the coating material onto the medium plate 2002 to form a test pattern on the medium plate 2002 (step S4).

Next, the test pattern on the medium plate 2002 is captured (step S5).

The test pattern is imaged by the imaging unit 1010 of the coating robot 1000, for example. The test pattern image captured (acquired) by the imaging unit 1010 is subjected to predetermined image processing by the image processing unit 9017 of the control device 901, and is subjected to abnormality determination based on the results of processing by the image processing unit 9017 (step S6).

If it is determined in step S6 that "there is no abnormality", coating can be performed (step S7). If it is determined in step S6 that "there is abnormality (constant discharge)", the coating is stopped (step S8), and the process is ended. This is because the constant discharge is a phenomenon in which the nozzle continues to discharge the coating material and cannot be handled by the maintenance operation. If it is determined in step S6 that "there is an abnormality (non-discharge/bend)", there is a possibility that the abnormality can be eliminated by the maintenance operation, and thus, the process returns to step S2. At this time, the number of cleaning counts N is incremented by one. If the number of cleaning counts after the increment exceeds the predetermined value M, the process proceeds to step S8, and if the number of cleaning counts after the increment is equal to or less than the predetermined value M, step S3 and subsequent steps are executed again. If the "abnormality (non-discharge/bend)" is eliminated before the predetermined value M is exceeded, coating can be performed. If the "abnormality (non-discharge/bend)" is not eliminated even after the predetermined value M is exceeded, coating is stopped (step S8), and the process is ended.

Supplements

In the present embodiment, the "liquid discharge apparatus" is an apparatus that includes a head that discharges a liquid and drives the head to discharge the liquid. The "liquid discharge apparatus" includes, in addition to apparatuses to discharge a liquid to objects onto which the liquid can adhere, apparatuses to discharge the liquid into a gas or a liquid.

The "liquid discharge apparatus" may include apparatuses to feed, convey, and eject objects to which a liquid can adhere. The liquid discharge apparatus may further include a pretreatment apparatus, a post-treatment apparatus, and others. The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge a liquid to visualize meaningful images, such as letters or figures. For example, the liquid discharge apparatus may be an apparatus to form meaningless images, such as meaningless patterns, or fabricate three-dimensional images.

The above-described "objects to which a liquid can adhere" represent objects to which a liquid can at least temporarily adhere, objects to which a liquid adheres and secures, or objects where a liquid adheres to and permeate into. Examples of the "objects to which a liquid can adhere" include recording media, such as paper, film, cloth, and steel plate, electronic components such as electronic substrate and piezoelectric element, and media such as powder layer, organ model, and testing cell. The "objects to which a liquid can adhere" includes any object to which a liquid can adhere, unless particularly limited.

The material of the "objects to which a liquid can adhere" may be any material as long as a liquid can adhere even temporarily, including a current collector such as paper, thread, fiber, cloth, leather, metal, plastic, glass, wood, ceramics, aluminum foil, or copper foil, or an electrode in which an active substance layer is formed on the current collector.

The "liquid" includes any liquid having a viscosity or a surface tension that is dischargeable from the head. However, the viscosity of the liquid is preferably 30 mPa·s or less under ordinary temperature and ordinary pressure or by heating or cooling. More specifically, examples of the liquid include solutions, suspensions, and emulsions containing solvents such as water and organic solvents, colorants such as dyes and pigments, function-imparting materials such as polymerizable compounds, resins, and surfactants, biocompatible materials such as DNA, amino acids, proteins, and calcium, edible materials such as natural pigments, active materials and solid electrolytes used as electrode materials, ink containing conductive materials and insulating materials, and the like. These liquids can be used as inkjet ink, surface treatment solution, a liquid for forming components of electronic element or light-emitting element or a resist pattern of electronic circuit, or a material solution for three-dimensional fabrication, electrode, or electrochemical element, for example.

The "liquid discharge apparatus" may be an apparatus to relatively move the head and an object to which a liquid can adhere. However, the liquid discharge apparatus is not limited to such an apparatus. Specific examples include a serial type apparatus that moves the head, a line type apparatus that does not move the head, and the like.

Examples of the liquid discharge apparatus further include a treatment liquid applying apparatus that discharges a treatment liquid onto a paper sheet to apply the treatment liquid to the surface of the paper sheet for the purpose of reforming the surface of the paper sheet, and an injection granulation apparatus that injects a composition liquid, in which a raw material is dispersed in a solution, through a nozzle to granulate fine particles of the raw material.

The "liquid discharge apparatus" is not limited to a stationary apparatus. The liquid discharge apparatus may be, for example, a robot on which a head is mounted and which can be moved by remote operation or autonomous traveling. The movable robot can be applied to coating of outer walls of a building, coating of road marks (crosswalk, stop line, speed display), and the like. In this case, the building and the road are also included in the "objects to which a liquid can adhere".

According to the present embodiment, the detection accuracy of the abnormal nozzle can be improved.

The above-described applications are mere examples, and the present embodiment produces advantageous effects specific to each of the following aspects.

Aspect 1

According to a first aspect (Aspect 1), a liquid discharge apparatus (for example, coating system 10000) includes a liquid discharger (for example, coating material discharger 1030) that discharges a liquid (for example, coating material) from a nozzle to form a test pattern on a detection target member (for example, medium plate 2002), an imaging unit (for example, imaging unit 1010) that captures the test pattern to acquire a test pattern image, an image processing unit (for example, image processing unit 9017) that performs image processing on the test pattern image acquired by the imaging unit, and a determination unit (for example, determination unit 9013) that determines the presence or absence of abnormality in the nozzle based on the result of processing by the image processing unit, in which the test pattern is formed on the detection target member such that the amount of the liquid per unit area is larger than an amount in a case where the liquid discharger discharges the liquid onto a discharge target object (for example, vehicle body U).

Aspect 2

According to a second aspect (Aspect 2), in the liquid discharge apparatus of the first aspect (Aspect 1), the test pattern is formed such that the discharge amount of the liquid from the nozzle is larger than the amount in the case where the liquid discharger discharges the liquid onto the discharge target object.

Aspect 3

According to a third aspect (Aspect 3), in the liquid discharge apparatus of the first aspect (Aspect 1), the test pattern is formed such that an inter-dot distance of the liquid is shorter than an inter-dot distance of the liquid in the case where the liquid discharger discharges the liquid onto the discharge target object.

Aspect 4

According to a fourth aspect (Aspect 4), in the liquid discharge apparatus of the third aspect (Aspect 3), the inter-dot distance is changed according to an environmental temperature.

Aspect 5

According to a fifth aspect (Aspect 5), in the liquid discharge apparatus of the fourth aspect (Aspect 4), the test pattern is formed with the inter-dot distance shortened in response to a change in the environmental temperature such that the discharge amount of the liquid from the liquid discharger decreases, and the test pattern is formed with the inter-dot distance extended in response to a change in the environmental temperature such that the discharge amount of the liquid from the liquid discharger increases.

Aspect 6

According to a sixth aspect (Aspect 6), in the liquid discharge apparatus of the third aspect (Aspect 3) or the fourth aspect (Aspect 4), the inter-dot distance is changed according to a type of the liquid.

Aspect 7

According to a seventh aspect (Aspect 7), in the liquid discharge apparatus of the sixth (Aspect 6), the test pattern is formed with the inter-dot distance shortened in response to a change in the discharge amount of the liquid from the liquid discharger so as to be decreased due to replacement of the liquid with a different type of liquid, and the test pattern is formed with the inter-dot distance extended in response to a change in the discharge amount of the liquid from the liquid discharger so as to be increased due to replacement of the liquid with a different type of liquid.

Aspect 8

According to an eighth aspect (Aspect 8), an abnormal nozzle detection method of a liquid discharge apparatus (for example, coating system 10000) includes a test pattern formation step (for example, step S4) of discharging a liquid (for example, coating material) from a nozzle to form a test pattern on a detection target member (for example, medium plate 2002), an imaging step (for example, step S5) of capturing the test pattern to acquire a test pattern image, and a determination step (for example, step S6) of determining the presence or absence of abnormality in the nozzle based on the test pattern image acquired in the imaging step, in which the test pattern is formed on the detection target member such that the amount of the liquid per unit area is larger than an amount in a case of discharging the liquid onto a discharge target object (for example, vehicle body U).

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A liquid discharge apparatus comprising:

a liquid discharger to discharge a liquid from a nozzle;

an imaging unit to capture a test pattern on a detection target member to acquire a test pattern image of the test pattern;

a liquid cleaner configured to periodically supply cleaning liquid to the nozzle of the liquid discharger and clean the nozzle with the cleaning liquid; and circuitry configured to:

cause the liquid discharger to discharge a first amount of the liquid per unit area from the nozzle onto a target object;

cause the liquid discharger to discharge a second amount of the liquid per unit area larger than the first amount from the nozzle onto the detection target member to form the test pattern on the detection target member;

perform image processing on the test pattern image on the detection target member acquired by the imaging unit; and detect an abnormal nozzle based on the test pattern image obtained by the image processing, wherein the test pattern includes the cleaning liquid and the liquid after the nozzle is cleaned with the cleaning liquid such that most of the cleaning liquid is covered by the liquid in the test pattern.

2. The liquid discharge apparatus according to claim 1, wherein the circuitry is further configured to:

cause the liquid discharger to discharge a first discharge amount of the liquid from the nozzle onto the target object; and cause the liquid discharger to discharge a second discharge amount of the liquid larger than the first discharge amount from the nozzle onto the detection target member to form the test pattern on the detection target member.

3. The liquid discharge apparatus according to claim 1, wherein the circuitry is further configured to:

cause the liquid discharger to discharge the liquid from the nozzle onto the target object multiple times to form multiple dots each having a first inter-dot distance with an adjacent dot; and cause the liquid discharger to discharge the liquid from the nozzle onto the detection target member multiple times to form multiple dots each having a second inter-dot distance, shorter than the first inter-dot distance, with an adjacent dot.

4. The liquid discharge apparatus according to claim 3, wherein the circuitry is further configured to change the second inter-dot distance according to an environmental temperature.

5. The liquid discharge apparatus according to claim 4, wherein the circuitry is further configured to:

reduce the second inter-dot distance in response to a change in the environmental temperature that decreases a discharge amount of the liquid from the liquid discharger increase the second inter-dot distance in response to a change in the environmental temperature that increases the discharge amount of the liquid from the liquid discharger.

6. The liquid discharge apparatus according to claim 3, wherein the circuitry is further configured to change the second inter-dot distance according to a type of the liquid.

7. The liquid discharge apparatus according to claim 6, wherein the circuitry is further configured to:

reduce the second inter-dot distance in response to replacement of the liquid with a different type of liquid that decreases a discharge amount of the liquid from the liquid discharger increase the second inter-dot distance in response to replacement of the liquid with a different type of liquid that increases the discharge amount of the liquid from the liquid discharger.

8. The liquid discharge apparatus according to claim 1, further comprising a mover configured to move the liquid discharger.

9. The liquid discharge apparatus according to claim 8, wherein the liquid discharge apparatus forms the test pattern while the mover accelerates a moving speed of the liquid discharger.

10. A liquid discharge method comprising:

discharging a first amount of a liquid per unit area from a nozzle onto a target object;

periodically applying a cleaning liquid to the nozzle to clean the nozzle;

discharging a second amount of the liquid per unit area larger than the first amount from the nozzle onto a detection target member to form a test pattern on the detection target member;

capturing the test pattern on the detection target member to acquire a test pattern image of the test pattern;

performing image processing on the test pattern image; and detect an abnormal nozzle based on the test pattern image obtained by the image processing, wherein the test pattern includes the cleaning liquid and the liquid after the nozzle is cleaned with the cleaning liquid such that most of the cleaning liquid is covered by the liquid in the test pattern.

11. The liquid discharge method according to claim 10, further comprising moving the liquid discharger prior to forming the test pattern.

12. The liquid discharge method according to claim 11, wherein, at a start of forming the test pattern, a moving speed of the liquid discharger accelerates.

* * * * *